US008854310B2

(12) United States Patent  (10) Patent No.: US 8,854,310 B2
Shigeta  (45) Date of Patent: Oct. 7, 2014

(54) PORTABLE ELECTRONIC APPARATUS AND OPERATION DETECTING METHOD OF PORTABLE ELECTRONIC APPARATUS

(75) Inventor: Saya Shigeta, Yokohama (JP)

(73) Assignee: Kyocera Corporation, Kyoto (JP)

( * ) Notice: Subject to any disclaimer, the term of this patent is extended or adjusted under 35 U.S.C. 154(b) by 934 days.

(21) Appl. No.: 12/438,922

(22) PCT Filed: Jul. 26, 2007

(86) PCT No.: PCT/JP2007/064701
§ 371 (c)(1),
(2), (4) Date: Oct. 16, 2009

(87) PCT Pub. No.: WO2008/023532
PCT Pub. Date: Feb. 28, 2008

(65) Prior Publication Data
US 2010/0090961 A1  Apr. 15, 2010

(30) Foreign Application Priority Data
Aug. 25, 2006 (JP) .................. 2006-229655

(51) Int. Cl.
G09G 5/00 (2006.01)
G06F 3/0354 (2013.01)
G06F 1/16 (2006.01)
(52) U.S. Cl.
CPC .......... *G06F 1/1615* (2013.01); *G06F 3/03548* (2013.01); *G06F 1/169* (2013.01); *G06F 1/1647* (2013.01); *H04M 2250/22* (2013.01); *H04M 2250/16* (2013.01)
USPC ......... 345/169; 345/156; 345/173; 178/18.01
(58) Field of Classification Search
USPC .................. 345/173, 174, 156, 157, 169; 178/18.01–18.11
See application file for complete search history.

(56) References Cited

U.S. PATENT DOCUMENTS 7,466,307 B2  12/2008 Trent et al. .................... 345/173
7,813,774 B2 * 10/2010 Perez-Noguera .......... 455/575.1
(Continued)

FOREIGN PATENT DOCUMENTS

JP  07107574 A  4/1995
JP  2001-184158  7/2001
(Continued)

OTHER PUBLICATIONS

Korean language office action dated Sep. 16, 2010 and its English language translation for corresponding Korean application lists the reference above.

(Continued)

*Primary Examiner* — Koosha Sharifi-Tafreshi
(74) *Attorney, Agent, or Firm* — DLA Piper LLP (US)

(57) ABSTRACT

Mobile electronic apparatus includes a first sensor element group G1 and a second sensor element group G2 respectively having sensor elements R1~R4, L1~L4 for detecting a contact and arranged continuously in an annular shape as a whole; and a control unit 320 capable of performing a first control in which each sensor element group is individually controlled. The control unit 320 can perform a second control different from the first control by detecting a contact detection started by a sensor element in any one sensor element group, continuous contact detections by sensor elements adjacent to the start sensor element continued to end portion of the sensor group, and then continuous contact detections from an end portion of another sensor group adjacent to the end portion of said one sensor group.

8 Claims, 24 Drawing Sheets

(56) References Cited

U.S. PATENT DOCUMENTS

| | | | |
|---|---|---|---|
| 2004/0196257 A1 | 10/2004 | Sato et al. | 345/156 |
| 2004/0252109 A1* | 12/2004 | Trent et al. | 345/174 |
| 2006/0071912 A1* | 4/2006 | Hill et al. | 345/173 |
| 2006/0202971 A1* | 9/2006 | Kaliher | 345/173 |
| 2006/0227117 A1* | 10/2006 | Proctor | 345/173 |
| 2007/0150842 A1* | 6/2007 | Chaudhri et al. | 715/863 |
| 2007/0152977 A1* | 7/2007 | Ng et al. | 345/173 |
| 2007/0152983 A1* | 7/2007 | McKillop et al. | 345/173 |
| 2008/0007539 A1* | 1/2008 | Hotelling | 345/173 |

FOREIGN PATENT DOCUMENTS

| | | |
|---|---|---|
| JP | 2003-280792 | 10/2003 |
| JP | 2004-311196 | 11/2004 |
| JP | 2005044026 A | 2/2005 |
| JP | 2005-522797 | 7/2005 |
| JP | 2005322087 A | 11/2005 |
| WO | WO 2006/070531 A1 | 7/2006 |

OTHER PUBLICATIONS

Japanese language office action dated Jul. 26, 2011 and its English language translation for corresponding Japanese application 2006229655.

Japanese language office action dated Sep. 18, 2012 and its English language translation issued in corresponding Japanese application 2011208876 cites the foreign patent documents above.

Japanese language office action dated Jun. 25, 2013 and its English language translation issued in corresponding Japanese application 2011808876.

\* cited by examiner

FIG. 6
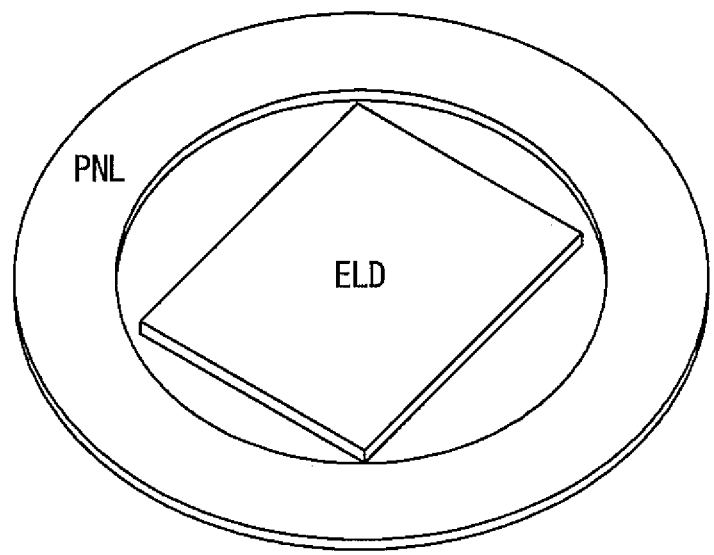
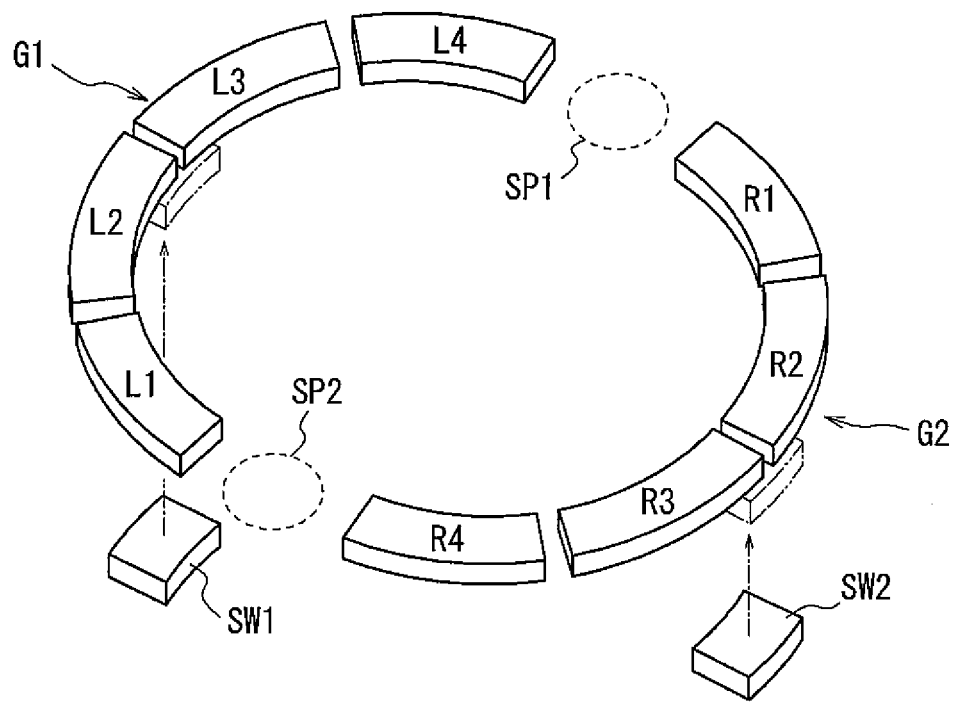

FIG. 8
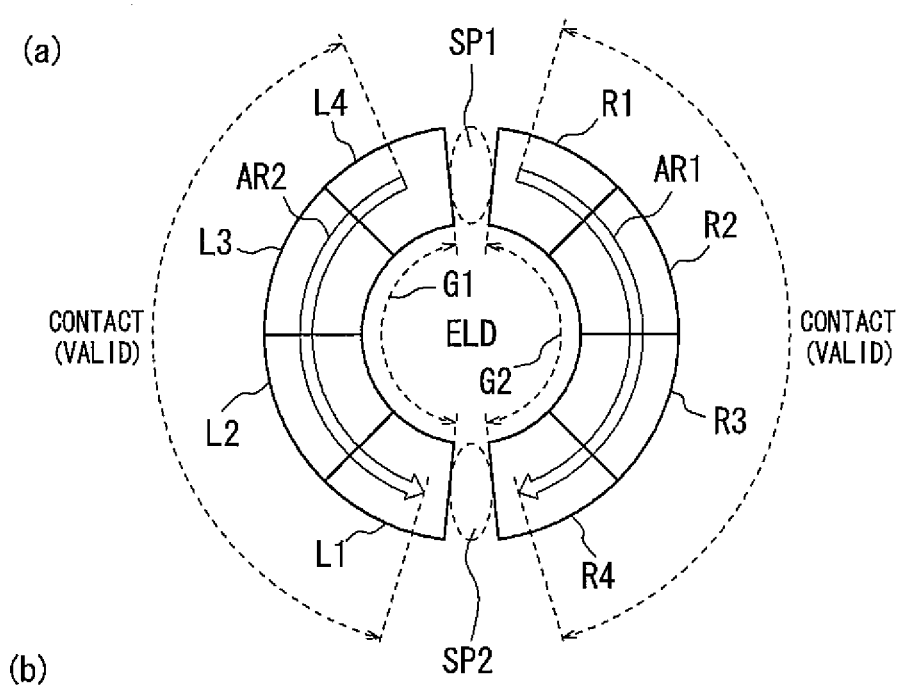
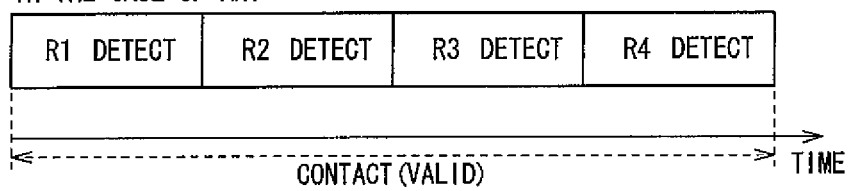
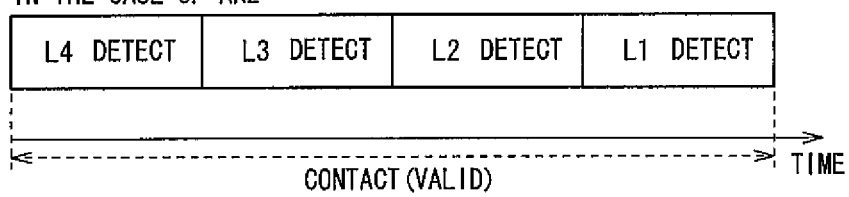
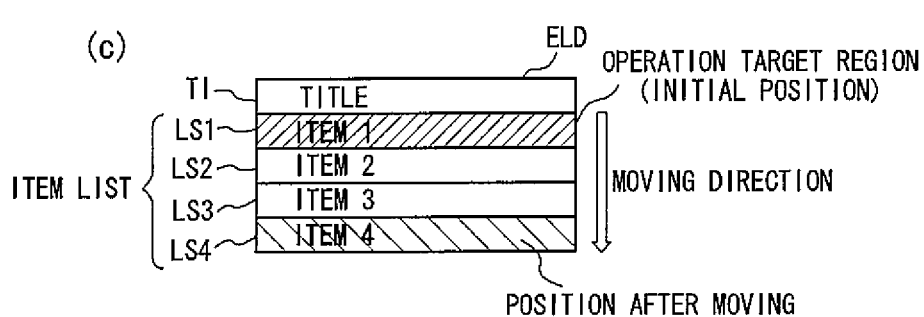

FIG. 9
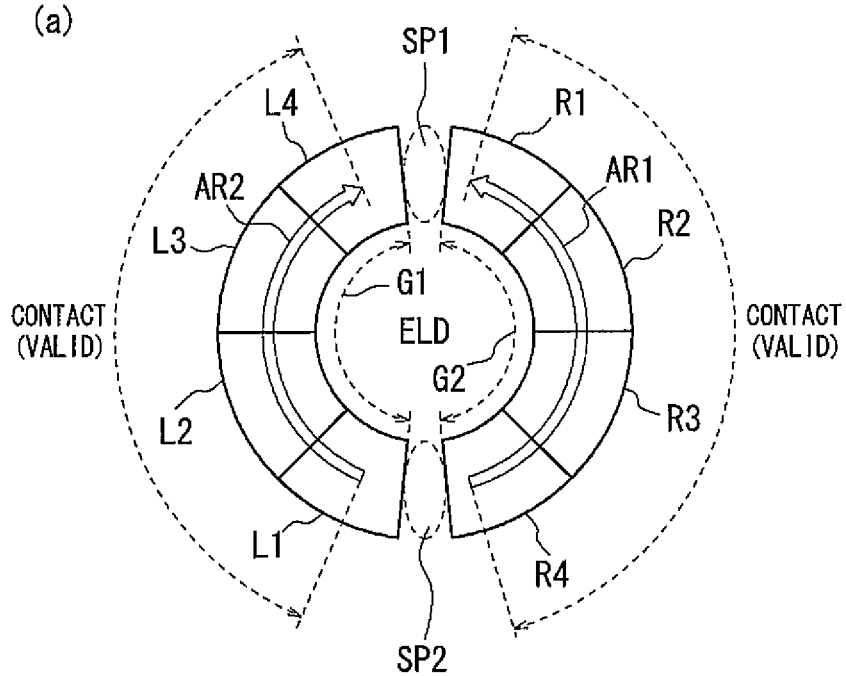
(a)
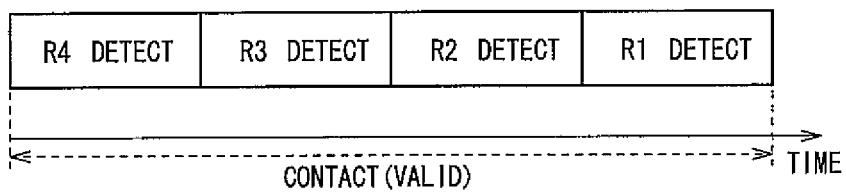
(b) IN THE CASE OF AR1
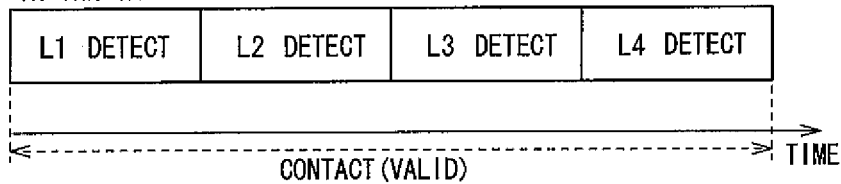
IN THE CASE OF AR2
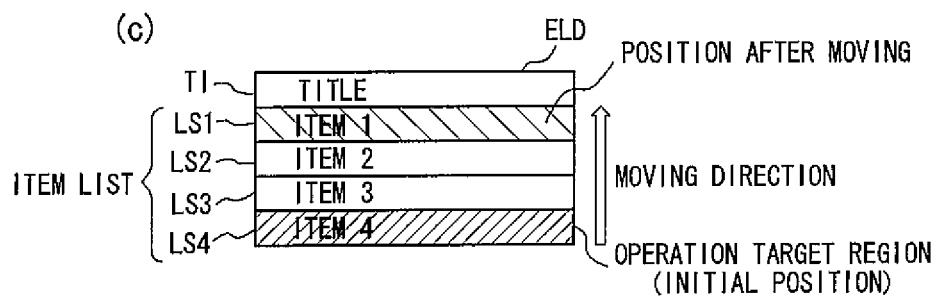
(c)

FIG. 10
(a)
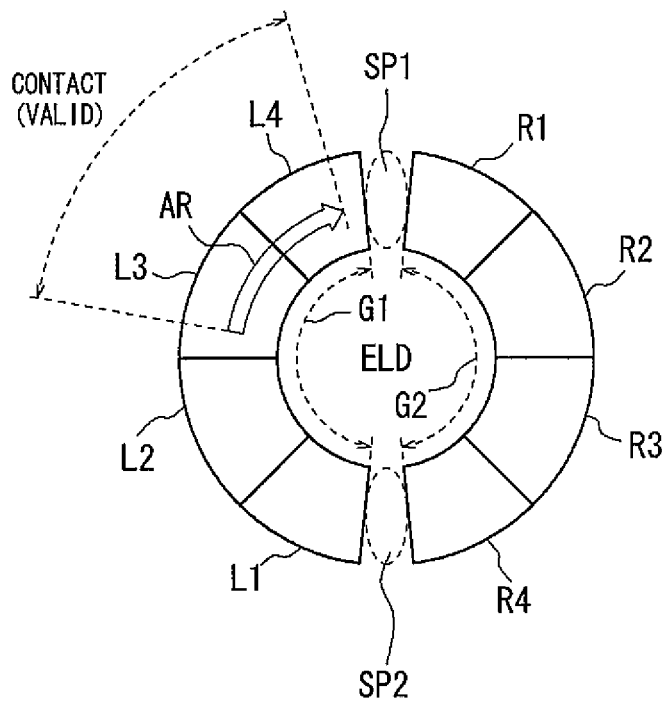
(b)
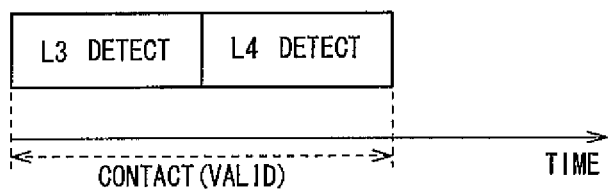
(c)
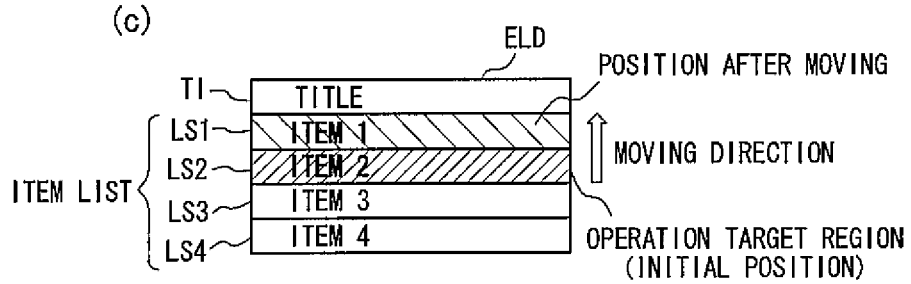

FIG. 11
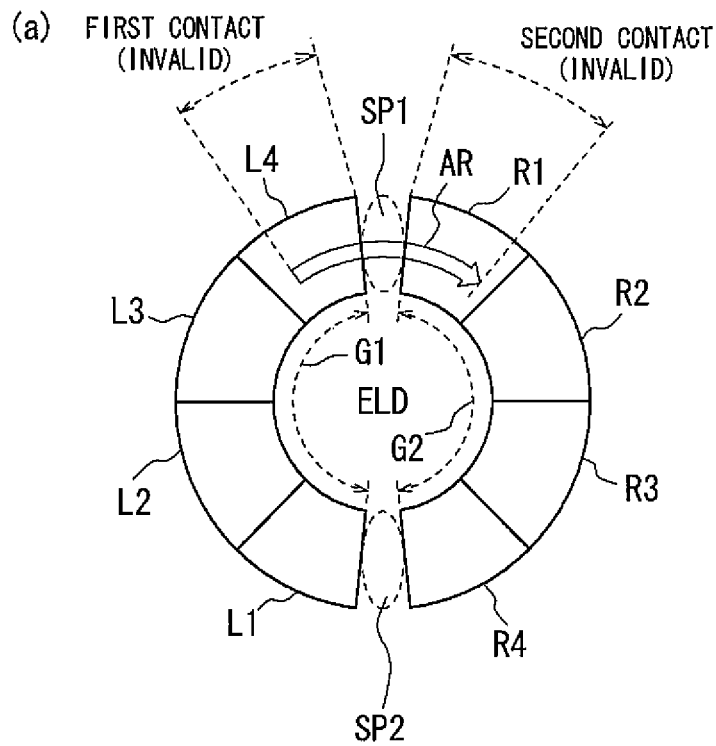
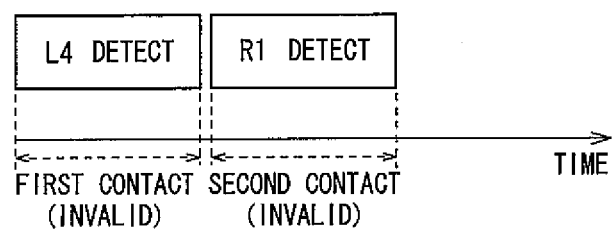
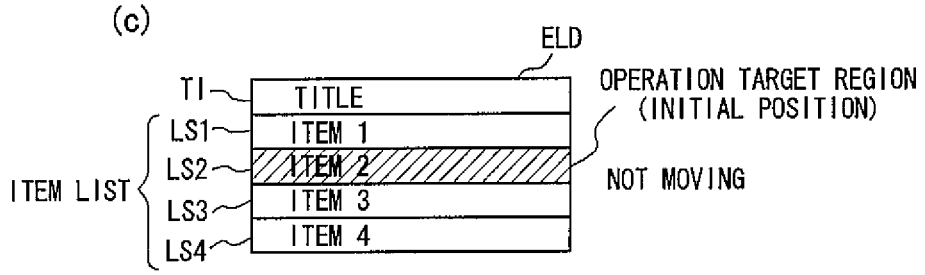

FIG. 12
(a)
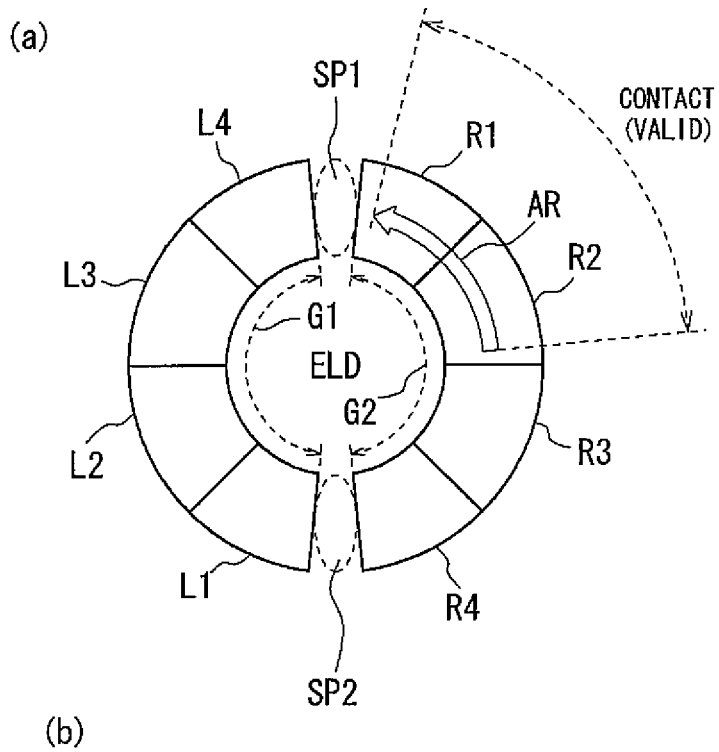
(b)
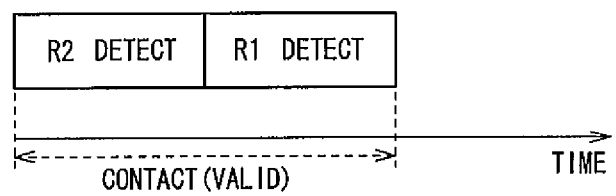
(c)
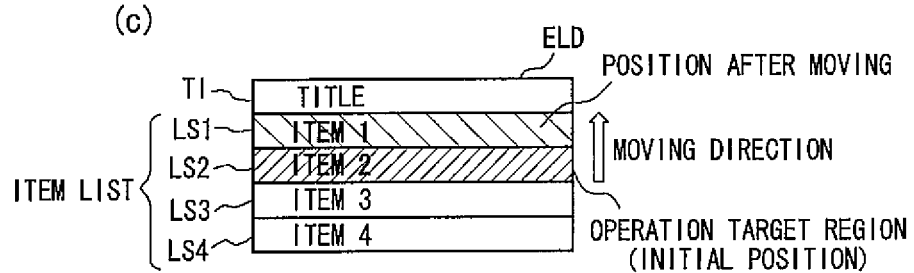

FIG. 13
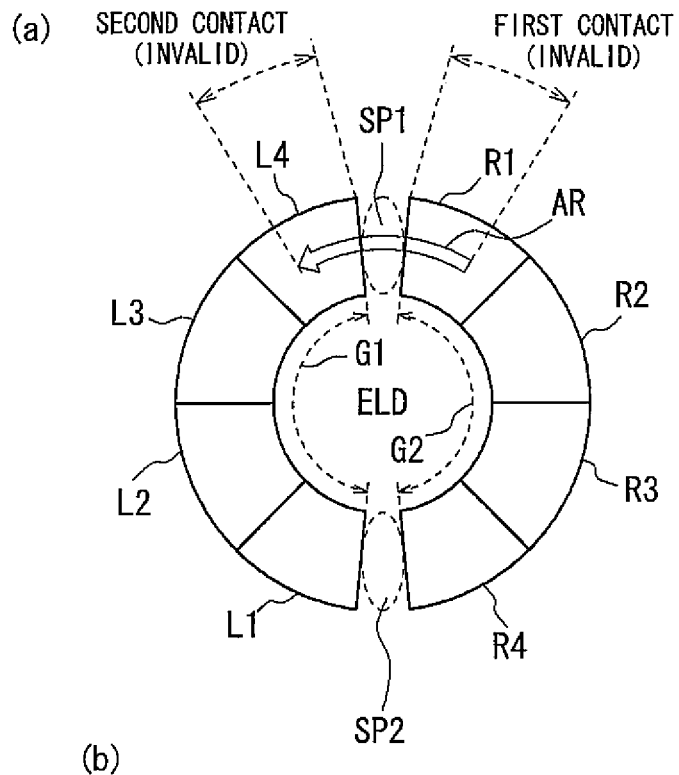
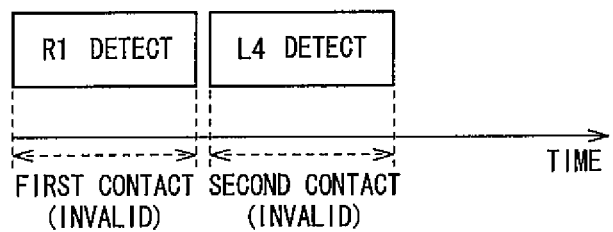
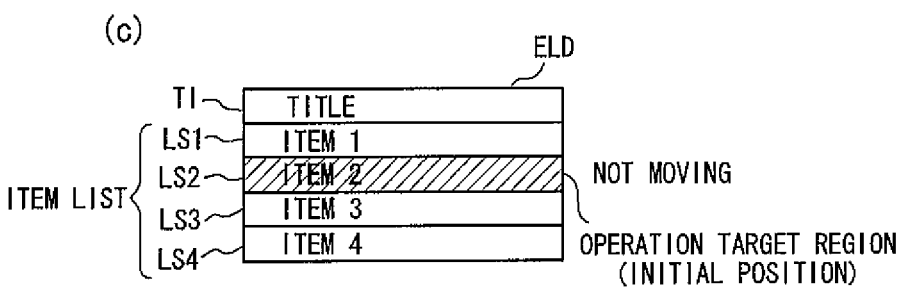

FIG. 14
(a)
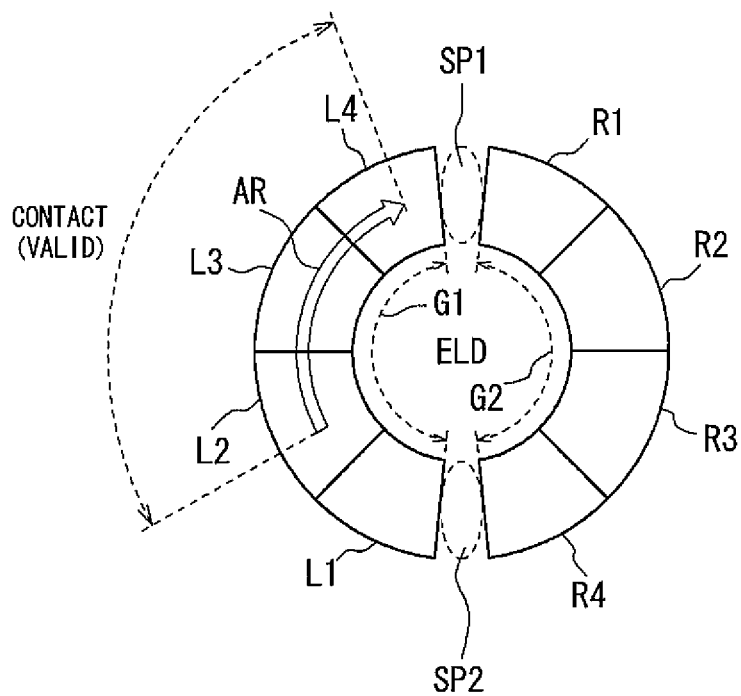
(b)
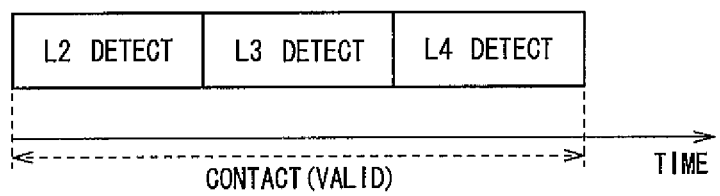
(c)
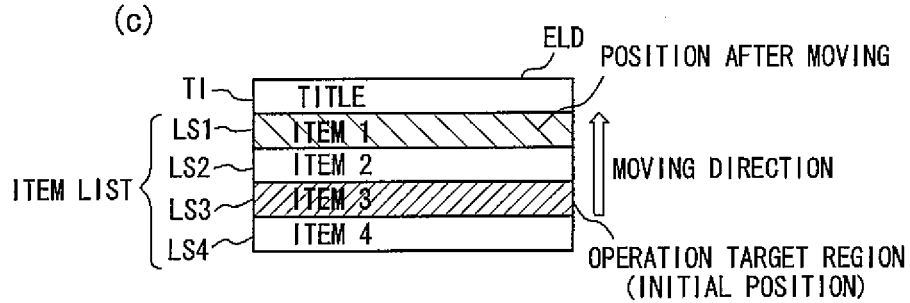

FIG. 15
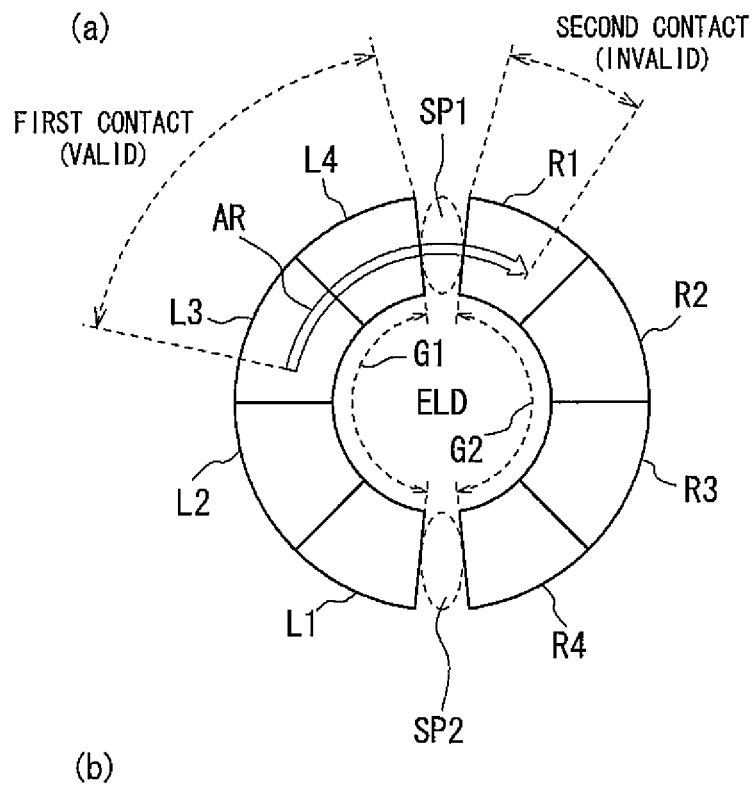
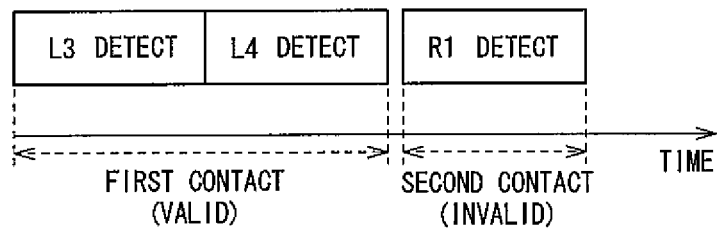
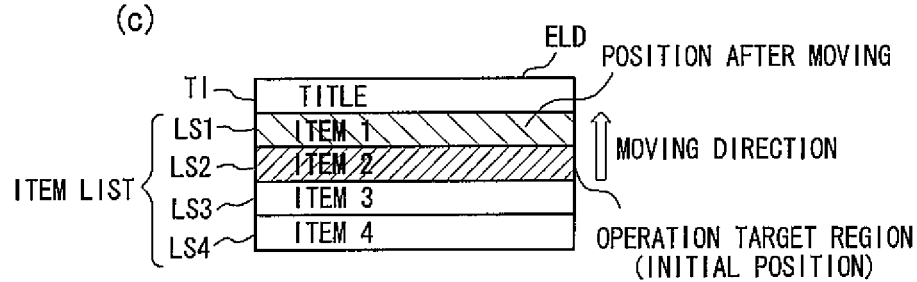

FIG. 16
(a)
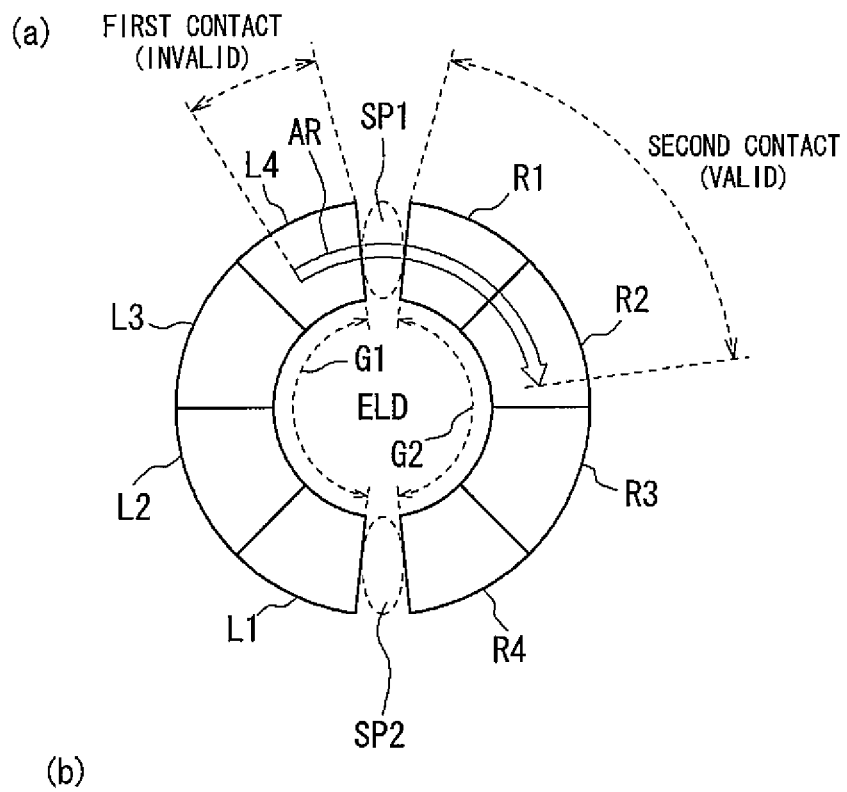
(b)
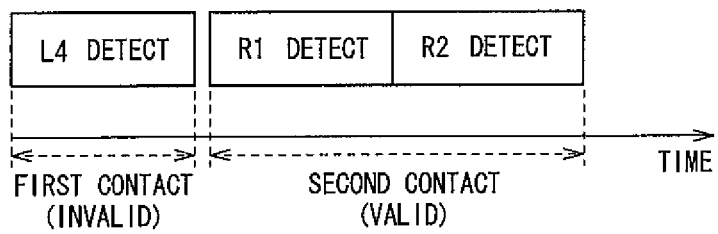
(c)
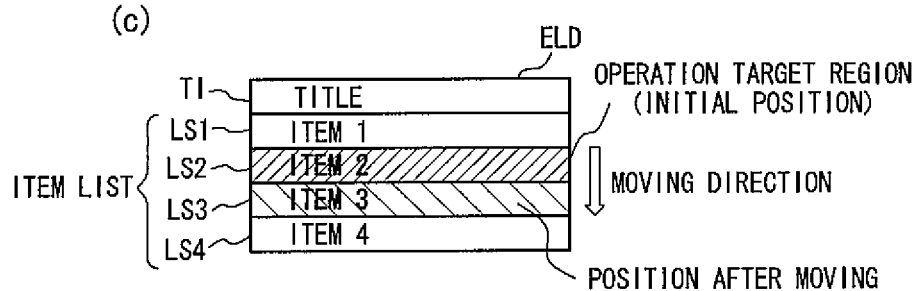

FIG. 17
(a)
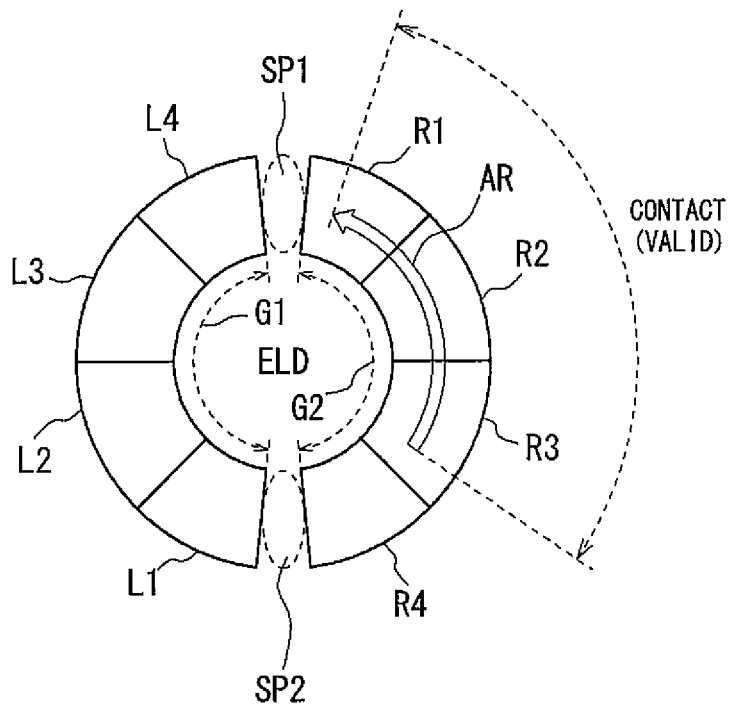
(b)
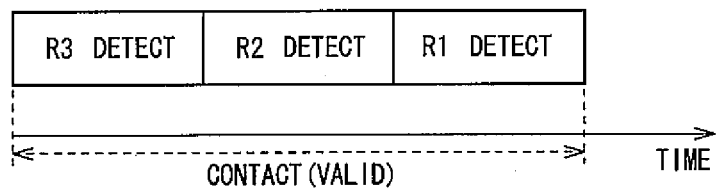
(c)
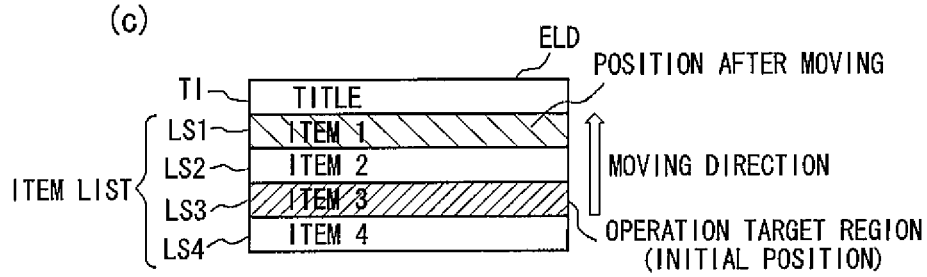

FIG. 18
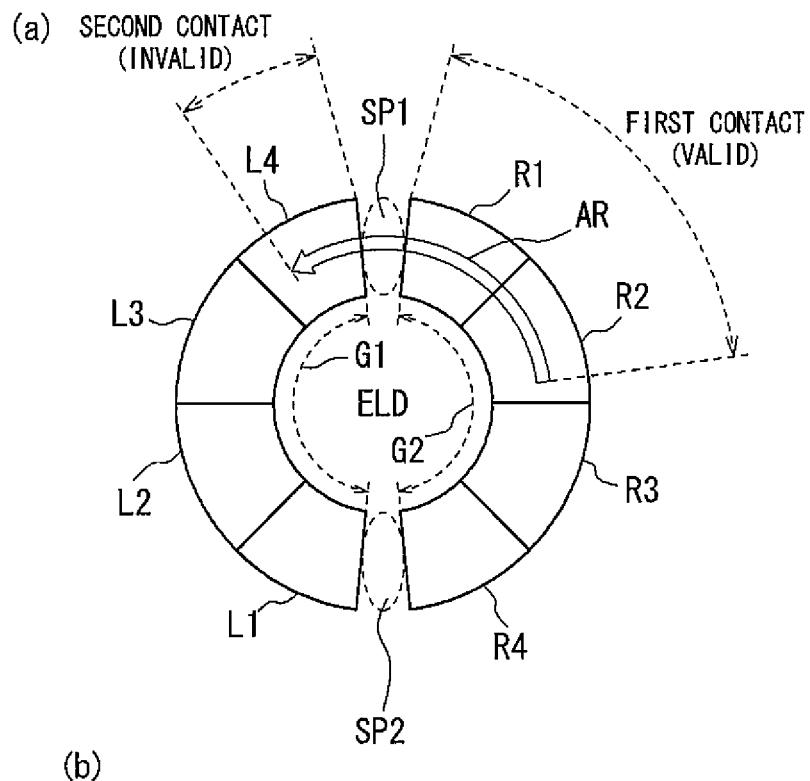
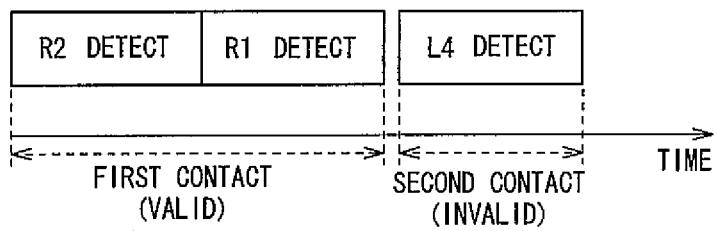
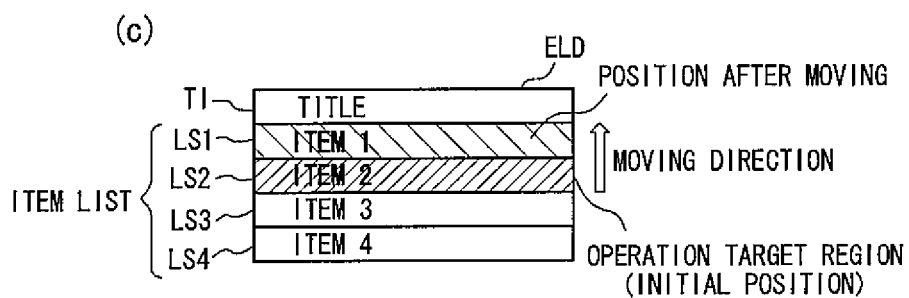

FIG. 19
(a)
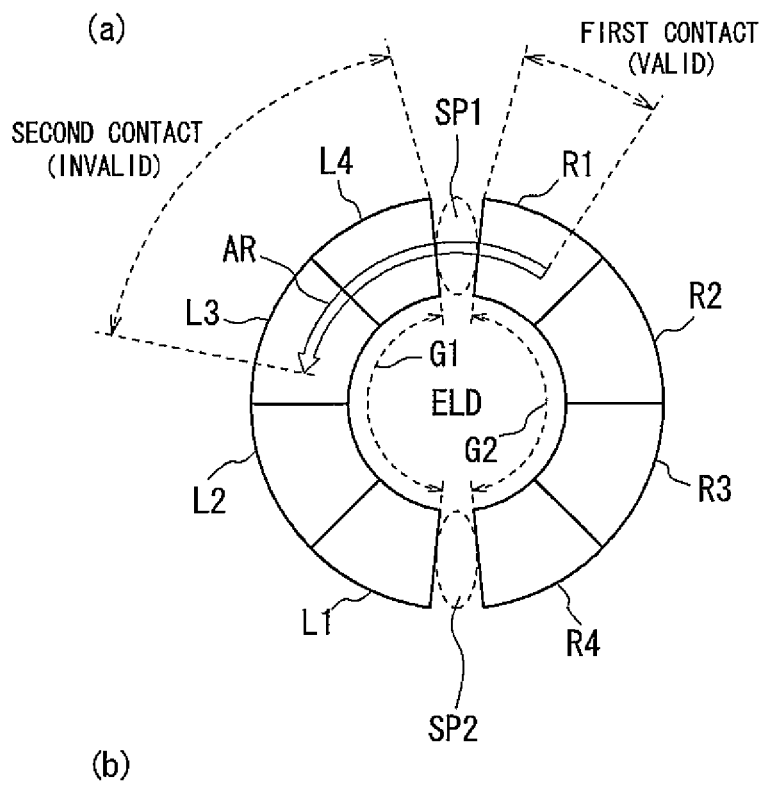
(b)
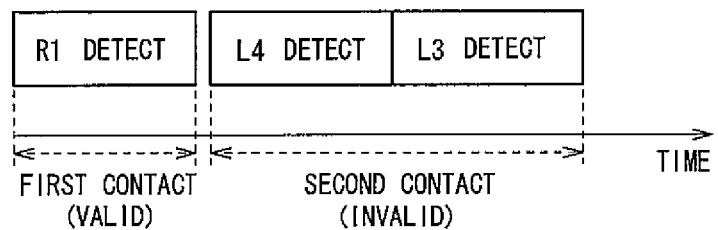
(c)
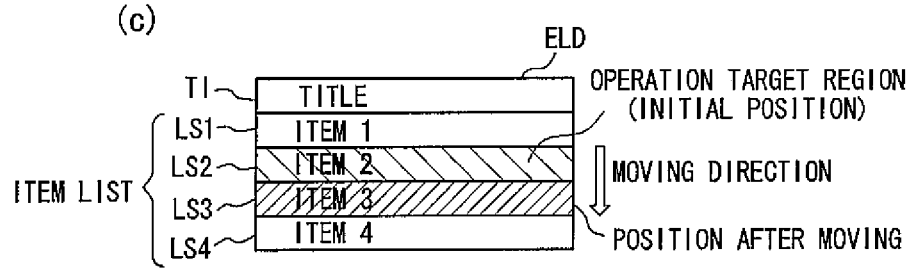

FIG. 21
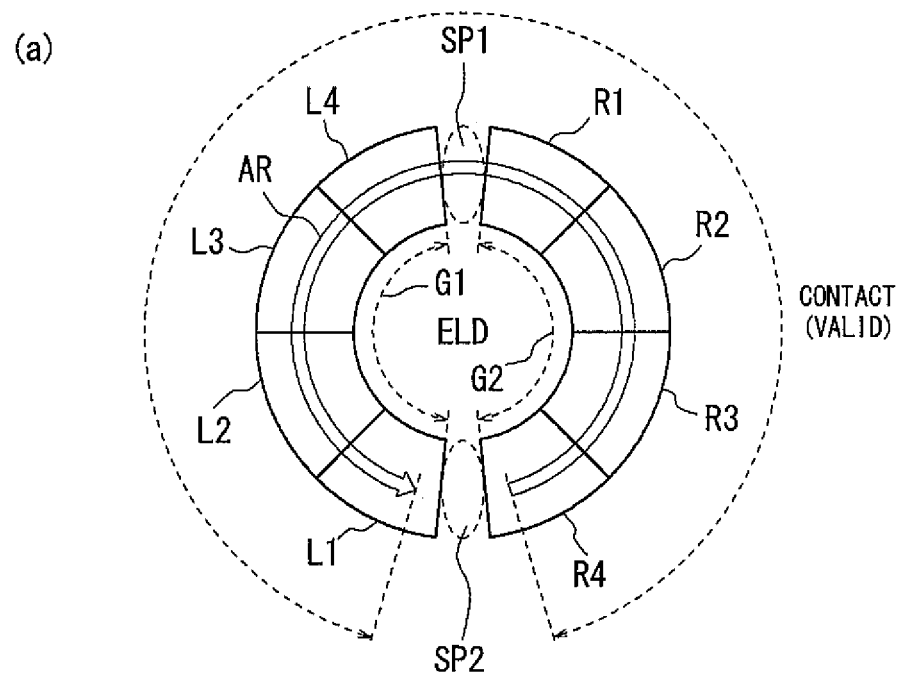
(a)
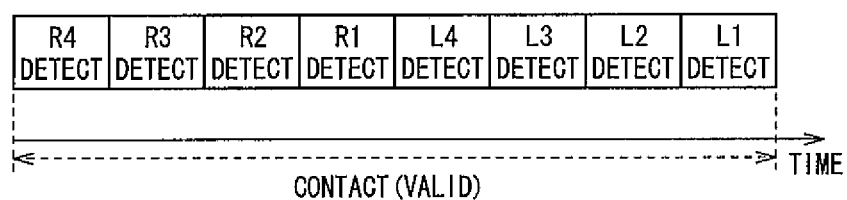
(b)

FIG. 22
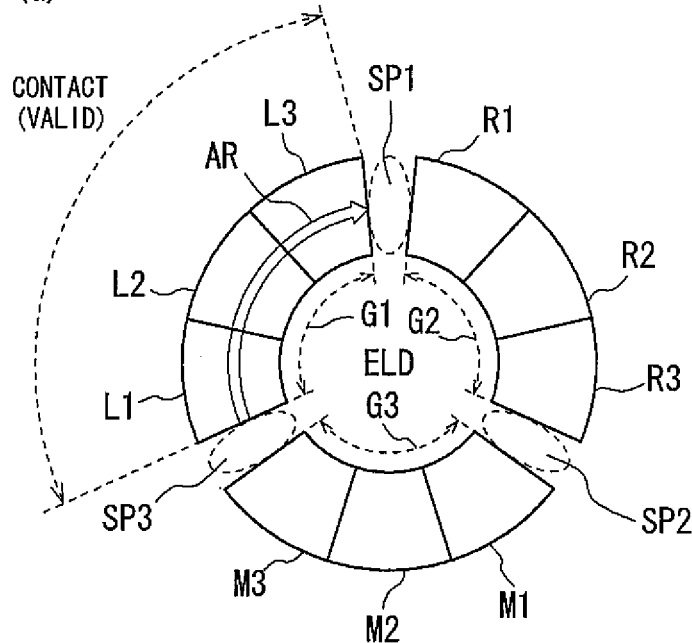
(a)
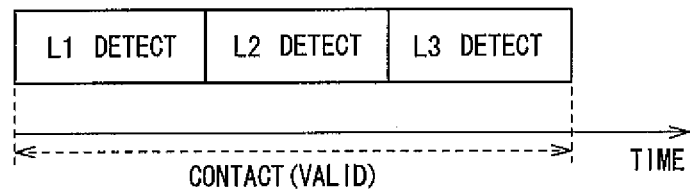
(b)
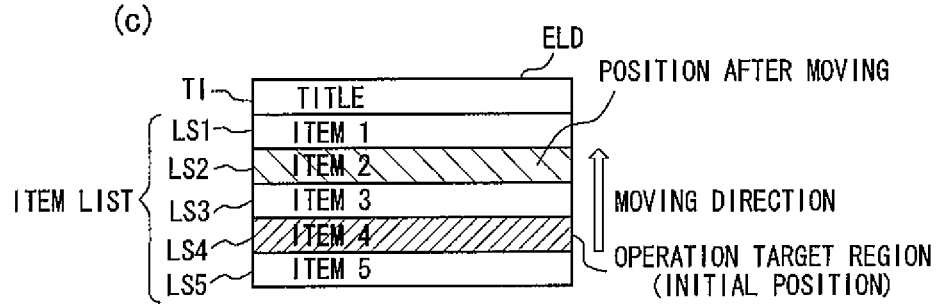
(c)

FIG. 23
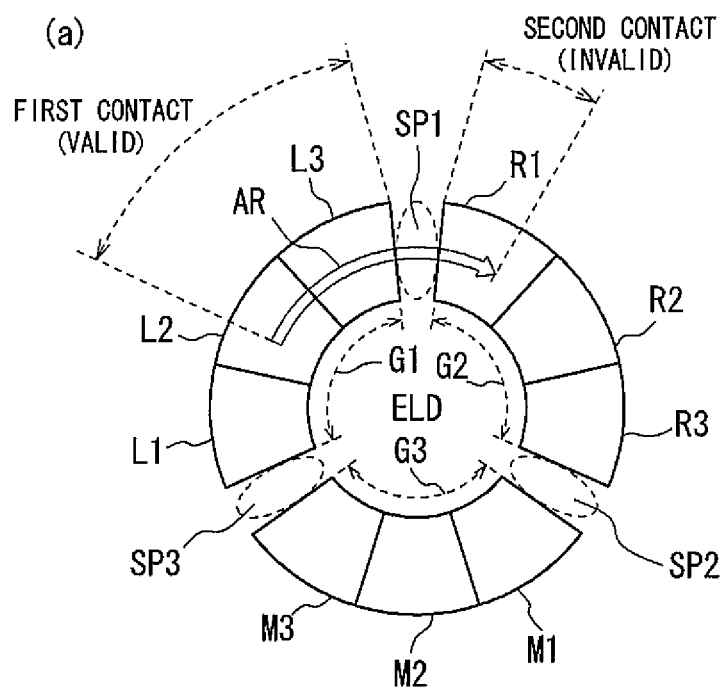
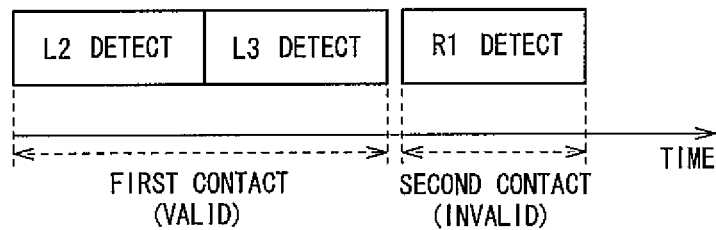
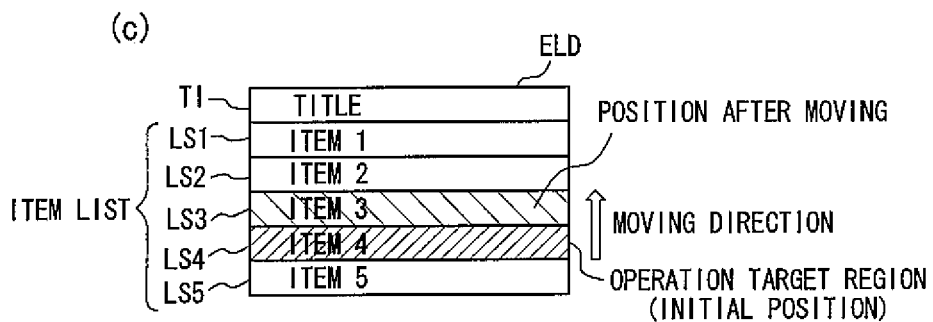

FIG. 24
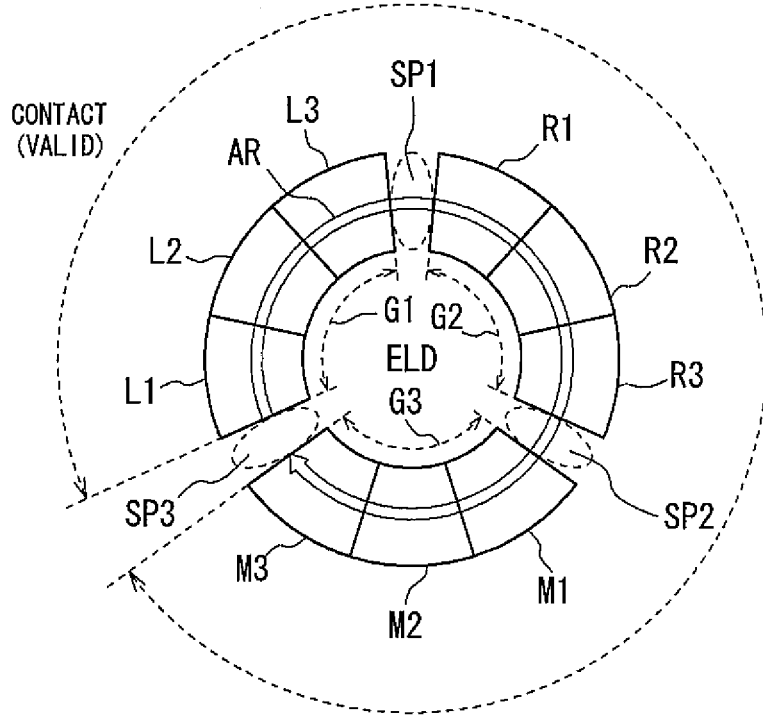
(a)
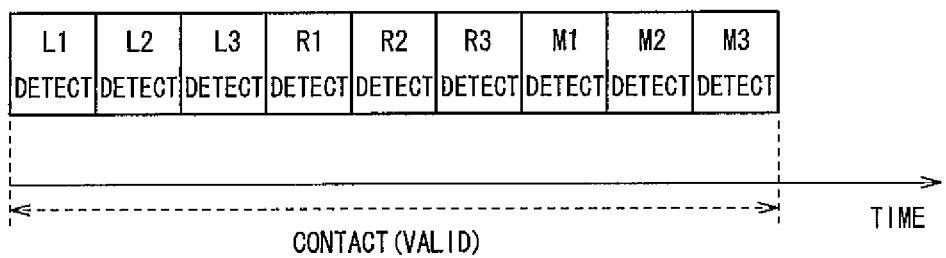
(b)

PORTABLE ELECTRONIC APPARATUS AND OPERATION DETECTING METHOD OF PORTABLE ELECTRONIC APPARATUS

CROSS REFERENCE TO RELATED APPLICATION

This application is a national stage of international application No. PCT/JP2007/064701 filed on Jul. 26, 2007, which also claims priority to and the benefit of Japanese Patent Application No. 2006-229655 filed Aug. 25, 2006, the entire content of which are incorporated herein by reference.

TECHNICAL FIELD

The present invention relates to a portable electronic apparatus, more specifically, to a portable electronic apparatus having a plurality of sensors annularly arranged for detecting contact as an operation input unit and an operation detecting method thereof.

BACKGROUND ART

Various interfaces and designs have been developed for an operation input unit of a portable electronic apparatus. For example, Japanese Patent Application Laid Open No. 2003-280792 discloses a portable electronic apparatus with a rotary dial input device that moves a cursor displayed on a display unit according to the rotation amount of the rotary dial input device.

However, since the technique disclosed in the Japanese Patent Application Laid Open No. 2003-280792 employs "rotary dial" rotated physically and mechanically, there are troubles or errors caused by mechanical abrasion, therefore maintenance of the operation input unit is necessary, and the durable period is short.

In order to solve above problems, for example, techniques employing touch sensor elements, which are not operated by physical and mechanical rotations, in an operation unit have been suggested in Japanese Patent Application Laid Open Nos. 2005-522797 and 2004-311196. These techniques arrange a plurality of touch sensors annularly to detect contacts, and when continuous contacts are detected, it determines there is a movement instruction of a cursor and moves the cursor according to the movement of detected contact points.

On the other hand, application programs (hereinafter, it is referred to as an application simply) executed in recent cellular phones have been diversified, and therefore various operations of a user are required.

However, techniques disclosed in Japanese Patent Application Laid Open Nos. 2005-522797 and 2004-311196 are limited to a process for detecting in which direction the plurality of touch sensors arranged annularly are contact-operated in a forward direction or a reverse direction, and moving a cursor in one direction or the other direction among two directions according to the detected direction. With these techniques, it is difficult to deal with various inputs by a user according to each application. Therefore, a mobile electronic apparatus only having such a touch sensor is not sufficient for a user interface that controls various operations of applications.

In order to solve the problem, it is considered to provide another user interface to having a different process management system on a housing of a portable electronic apparatus, as well as a sensor element group detecting two-directional movement. However, in a portable electronic apparatus, a surface area of a housing on which the sensor element group and another user interface are mounted is limited, and therefore it has to employ a sensor element group and another user interface having small sizes, respectively.

However, employing the small sensor element group and small another user interface mounted on the housing of the portable electronic apparatus compels a user to do an input operation with a small movement of a finger. Thus, the user is likely to make mistakes and the sensor element group cannot determine an input as user's intention.

SUMMARY OF THE INVENTION

It is an advantage of the present invention to provide a portable electronic apparatus having improved operability with an enough operation area for a user to do input operations without enlarging a mounting area of a user interface, and that a user can operate as his intention, and a control method thereof.

To solve the problem, according to a first aspect of the present invention, a portable electronic apparatus includes:

a first sensor element group and a second sensor element group having a plurality of sensor elements for detecting a contact and arranged continuously; and a control unit capable of performing a first control in which individual controls are performed for the first sensor element group and the second sensor element group respectively according to a contact detection of a sensor element, wherein the first sensor element group and the second sensor element group are arranged so that their ends are adjacent each other, and the control unit is capable of performing a second control in which a control is performed based on both contact detections of a first contact detection by a sensor element in one sensor element group of the first sensor element group and the second sensor element group, and a second contact detection by a sensor element in another sensor element group.

According to a second aspect of the present invention, in the portable electronic apparatus according to the first aspect, the control unit performs the first control according to continuous contact detections by a plurality of sensor elements along an arrangement direction of sensor elements in each group, only within either one group of the first sensor element group and the second sensor element group.

According to a third aspect of the present invention, in portable electronic apparatus according to the first aspect, the first sensor element group and the second sensor element group are disposed for their sensor elements to be arranged in an annular shape, and the control unit performs the second control when contacts are continuously detected by sensor elements along the annular shape from the first sensor element group to the second sensor element group.

According to a fourth aspect of the present invention, in the portable electronic apparatus according to the second aspect, the first sensor element group and the second sensor element group are disposed for their sensor elements to be arranged in an annular shape, and the control unit performs the second control when contacts are continuously detected by sensor elements along the annular shape from the first sensor element group to the second sensor element group.

According to a fifth aspect of the present invention, the portable electronic apparatus according to the third aspect, further includes a display unit for displaying a selection item, wherein the first control is related to a selection operation for selecting an item in the selection item displayed on the display unit, and the second control is related to a circulation detection in the first sensor element group and the second sensor element group.

According to a sixth aspect of the present invention, the portable electronic apparatus according to the fourth aspect, further includes a display unit for displaying a selection item, wherein the first control is related to a selection operation for selecting an item in the selection item displayed on the display unit, and the second control is related to a circulation detection in the first sensor element group and the second sensor element group.

Moreover, according to a seventh aspect of the present invention, a control method for a portable electronic apparatus having a first sensor element group and a second sensor element group in which a plurality of sensor elements for detecting contacts are continuously arranged to be adjacent, includes:

performing a contact detection of a sensor element in each sensor element group;

performing a first control in which individual controls are performed for the first sensor element group and the second sensor element group respectively according to a contact detection of a sensor element; and performing a second control in which a control is performed based on both of a contact detection by a sensor element in one sensor element group of the first sensor element group and the second sensor element group, and a contact detection by a sensor element in another sensor element group.

BRIEF DESCRIPTION OF DRAWINGS

FIG. 6 is an exploded perspective view of elements of the cellular phone terminal shown in FIG. 5;

FIG. 8 shows a response of the sub-display unit when a user traces on sensor elements;

FIG. 9 shows a response of the sub-display unit when a user traces on sensor elements;

FIG. 10 shows a response of the sub-display unit when a user traces on sensor elements.

FIG. 11 shows a response of the sub-display unit when a user traces on sensor elements;

FIG. 12 shows a response of the sub-display unit when a user traces on sensor elements;

FIG. 13 shows a response of the sub-display unit when a user traces on sensor elements;

FIG. 14 shows a response of the sub-display unit when a user traces on sensor elements;

FIG. 15 shows a response of the sub-display unit when a user traces on sensor elements;

FIG. 16 shows a response of the sub-display unit when a user traces on sensor elements;

FIG. 17 shows a response of the sub-display unit when a user traces on sensor elements;

FIG. 18 shows a response of the sub-display unit when a user traces on sensor elements;

FIG. 19 shows a response of the sub-display unit when a user traces on sensor elements;

FIG. 21 shows a response of the sub-display unit when a user traces on sensor elements;

FIG. 22 shows a response of the sub-display unit when a user traces on sensor elements according to a variation of the present invention;

FIG. 23 shows a response of the sub-display unit when a user traces on sensor elements according to a variation of the present invention; and FIG. 24 shows a response of the sub-display unit when a user traces on sensor elements according to a variation of the present invention.

DESCRIPTION OF EMBODIMENTS

Figure 1:
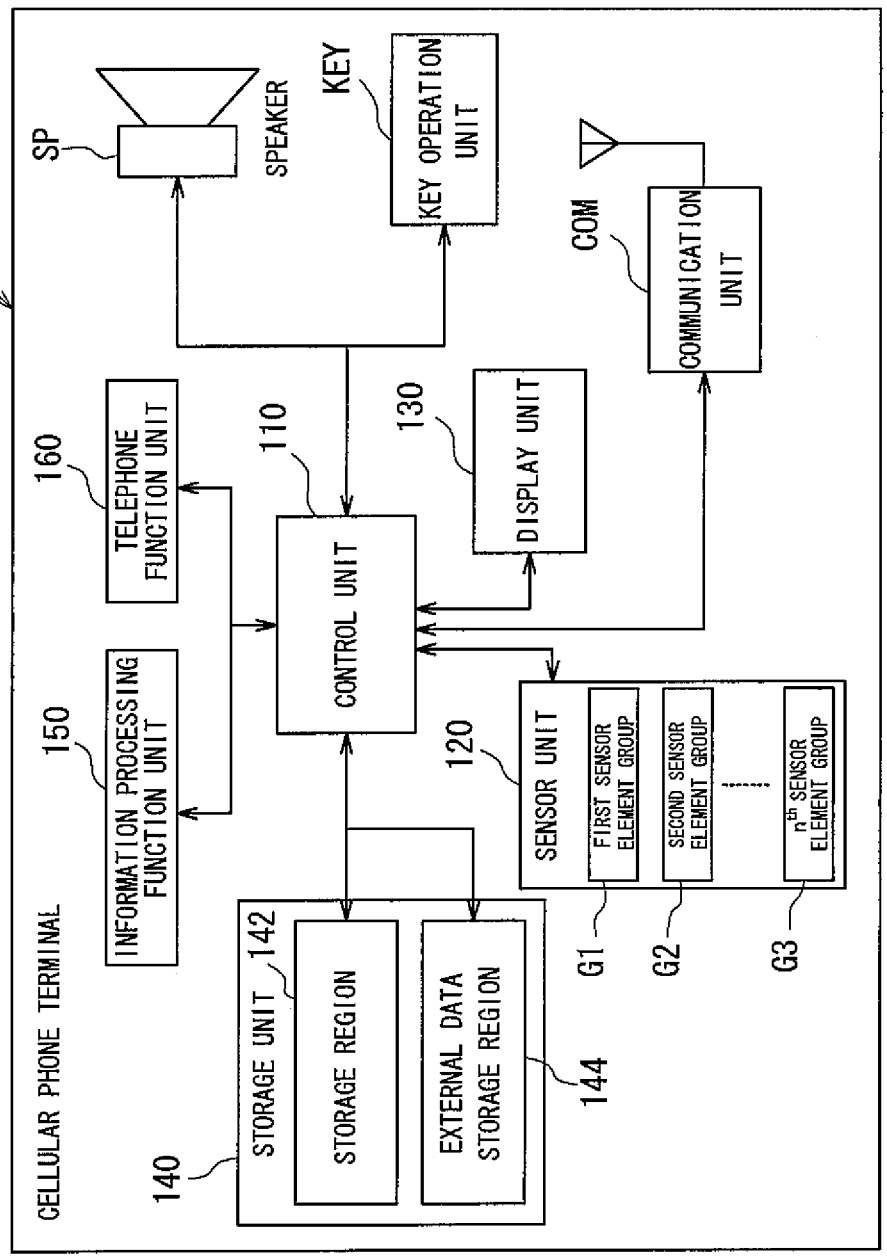
FIG. 1 is a block diagram illustrating a basic design of a cellular phone terminal according to the present invention.

Preferred embodiments of the present invention will now be described with reference to the accompanying drawings. In the following description, the present invention is applied to a cellular phone as a typical example of a portable electronic apparatus. FIG. 1 is a block diagram illustrating a basic design of a cellular phone terminal according to an embodiment of the present invention. The cellular phone terminal 100 includes a control unit 110, a sensor unit 120, a display unit 130, a storage unit (flash memory or the like) 140, an information processing function unit 150, a telephone function unit 160, a key operation unit KEY, a speaker SP and a communication unit COM for performing communication by being connected to CDMA communication network (not shown). The sensor unit 120 includes n sensor element groups as usage, in other words, a first sensor element group G1, a second sensor element group G2, and an $n^{th}$ sensor element group G3, and the sensor element group has a plurality of sensors (for example, contact sensors having detection portions arranged on a surface of a housing for detecting contact or approach of an object such as a finger or the like). The storage unit 140 has a storage region 142 and an external data storage region 144. The control unit 110 and the information operation function unit 150 preferably have calculation means such as CPU, software module and the like. In addition, a serial interface unit SI described later, an RFID module RFID and an infrared communication unit IR connected to the control unit 110 through the serial interface unit SI, a camera 220, a light 230, a microphone MIC, a radio module RM, a power supply PS, a power supply controller PSCON, etc. are connected to the control unit 110, but they are not shown in the figure for simplification.

The control unit 110 detects a contact of an object such as user's finger or the like with the sensor unit 120, stores the detected information into the storage region 142 of the storage unit 140, and controls the information processing function unit 150 to process the stored information. The control unit 110 displays information according to a processing result on the display unit 130. The control unit 110 also controls the telephone function unit 160 for normal telephone function, the key operation unit KEY, and the speaker SP. The display unit 130 has a sub-display unit ELD, and a main display unit (which is a display unit provided on a place which is hidden when the cellular phone terminal 100 is closed and exposed when the cellular phone terminal 100 is open) not shown.

Figure 2:
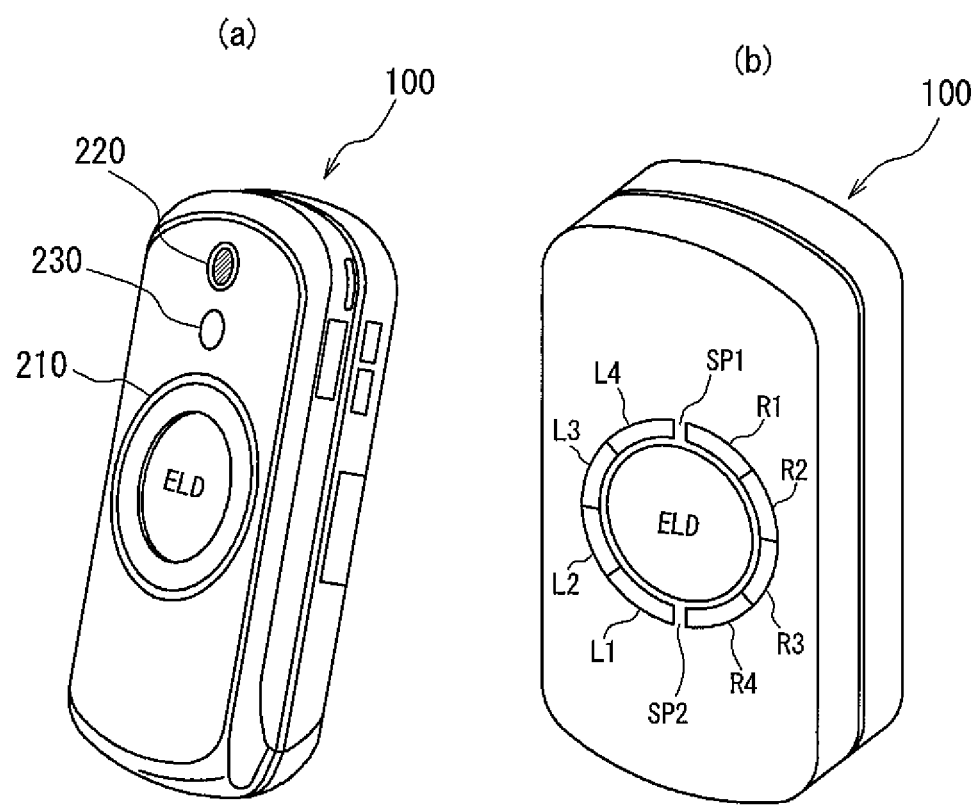
FIG. 2 is a perspective view of the cellular phone terminal having sensor elements mounted on a housing.

FIG. 2 shows an appearance of the cellular phone terminal according to this embodiment. FIG. 2(a) is a perspective view illustrating an appearance of the cellular phone terminal 100, and FIG. 2(b) is a perspective view illustrating only sensor elements and arrangement of around the sub-display unit ELD with omitting a panel PNL for describing an operation of the sensor unit 120 of the cellular phone terminal 100. The cellular phone terminal 100 shown in FIG. 2(a) has the sensor unit 120 (the panel PNL that covers the sensor element groups G1, G2 and is described later by referring to FIG. 6 is shown), the camera 220, and the light 230. The cellular phone terminal 100 can be in an open state by rotating a hinge unit or being slid as well as a closed state as shown in FIG. 2, and the sensor unit 120 is provided on a place to be also operable in the closed state. Sensor elements L1~L4 and R1~R4 shown in FIG. 2(b) are capacitance-type contact sensors, and arranged annularly around the sub-display unit ELD, which is an organic electroluminescence display.

Sensor elements L1~L4 compose the first sensor element group G1, and sensor elements R1~R4 compose the second sensor element group G2. In other words, in this embodiment, the sensor unit 120 is composed of the first sensor element group G1 and the second sensor element group G2. The first sensor element group G1 and the second sensor element group G2 are designed to interpose the sub-display unit ELD between them with a line symmetric layout with respect to an arrangement direction of selection candidate items, and are arranged side by side with being separated by separating to portions SP1, SP2. The sub-display unit ELD is not limited to an organic EL display, but may use, for example, a liquid crystal display or the like. Moreover, sensor elements L1~L4 and R1~R4 are not limited to capacitance-type contact sensors, but thin-film-resistance-type contact sensors may be employed.

In FIG. 2, the sub-display unit ELD displays information according to an application executed in the cellular phone terminal 100. For example, while an application of a music player is executed, titles of music that can be played are displayed on the sub-display unit ELD. A set of a music title and artist name forms one item, in other words, "selection candidate item". A user selects a music title with moving an item or an operation target region displayed on the sub-display unit ELD by operating the sensor unit 120 and changing the capacitance of sensor elements R1~R4 and L1~L4. Arranging contact sensors side by side around the sub-display unit ELD shown in FIG. 2 allows sensor elements to be formed so as not to occupy a large area on the housing of the small cellular phone as well as allows a user to operate sensor elements with viewing the display on the sub-display unit ELD.

Figure 3:
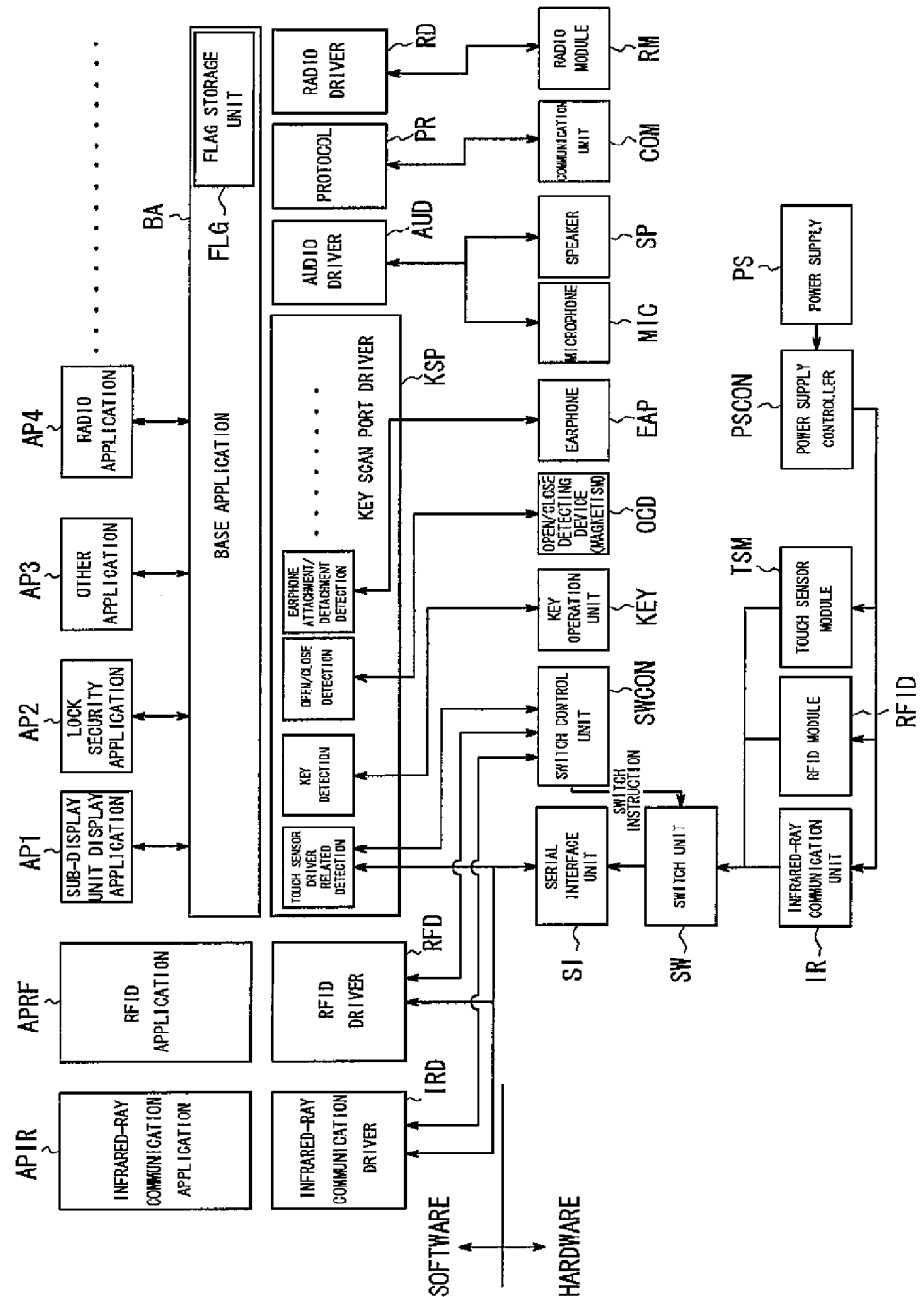
FIG. 3 is a detailed functional block diagram of the cellular phone terminal according to the present invention.

FIG. 3 is a detailed functional block diagram of the cellular phone terminal 100 according to this embodiment. Software of all kinds shown in FIG. 3 sets up a work area on the storage unit 140 based on programs stored in the storage unit 140, and executed by the control unit 110. As shown, each function of the cellular phone terminal 100 is divided into a software block and a hardware block. The software block includes a base application BA having a flag storage unit FLG, a sub-display unit display application AP1, a lock security application AP2, other applications AP3 and a radio application AP4. The software block also includes an infrared-ray communication application APIR and a RFID application APRF. When these applications control hardware of all kinds of the hardware block, an infrared-ray communication driver IRD, an RFID driver RFD, an audio driver AUD, a radio driver RD, and a protocol PR are used as drivers. For example, the audio driver AUD, the radio driver RD, and the protocol PR control the microphone MIC, the speaker SP, the communication unit COM, and the radio module RM, respectively. The software block further includes a key scan port driver KSP for monitoring and detecting operation conditions of the hardware, and performs detections related to a touch sensor driver, key detections, opening/closing detections of the cellular phone, which may be a folded type, slide type or the like, attaching/detaching detections of an ear phone and the like.

The hardware block includes the key operation unit KEY having various buttons such as a dial key or tact switches SW1, SW2 described later, an open/close detecting device OCD for detecting opening/closing based on operation state of the hinge or the like, the microphone MIC attached to the main body, the earphone EAP which is attachable and detachable, the speaker SP, the communication unit COM, the radio module RM, the serial interface unit SI, and a switch control unit SWCON, and the like. The switch control unit SWCON selects one among the infrared-ray communication unit IR, the RFID module (wireless identification tag) RFID, and a touch sensor module TSM (which is formed as a module of the sensor unit 120 and necessary components on driving the sensor unit 120 such as a vibration circuit or the like) forming the first sensor element group G1 and the second sensor element group G2 according to a command from a corresponding block in software blocks, and switches the selectable hardware (IR, RFID, TSM) so that the serial interface unit SI picks up the corresponding command. The power supply PS provides power to the selectable hardware (IR, RFID, TSM) through the power supply controller PSCON.

Figure 4:
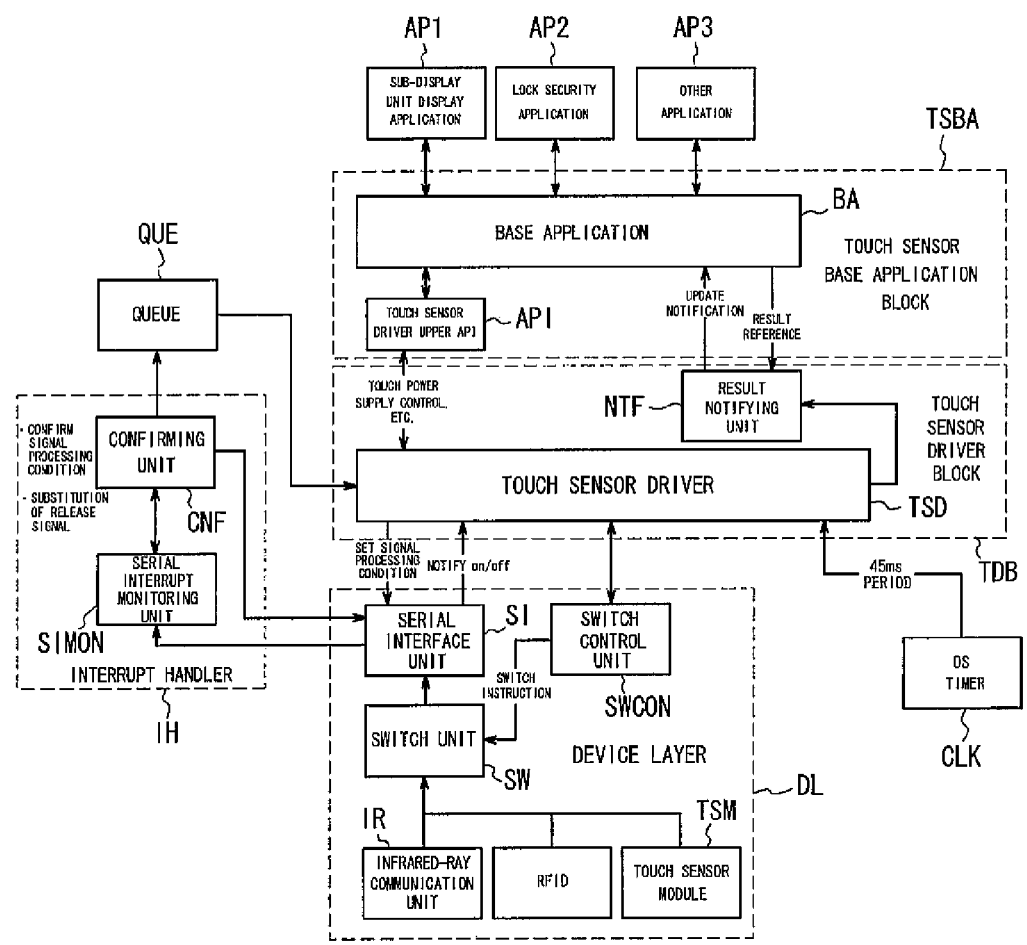
FIG. 4 is a detailed block diagram illustrating touch sensor functions of the cellular phone terminal according to the present invention.

FIG. 4 is a detailed block diagram illustrating functions of the touch sensor of the cellular phone terminal 100 according to this embodiment. The cellular phone terminal 100 has a touch sensor driver block TDB, a touch sensor base application block TSBA, a device layer DL, an interrupt handler IH, a queue QUE, an OS timer CLK, and various applications AP1~AP3. The touch sensor base application block TSBA has the base application BA and a touch sensor driver upper application interface API, and the touch sensor driver block TDB has a touch sensor driver TSD and a result notifying unit NTF. The device layer DL has the switch control unit SWCON, a switch unit SW, the serial interface unit SI, the infrared-ray communication unit IR, the RFID and the touch sensor module TSM, and the interrupt handler IH has a serial interrupt monitoring unit SIMON and a confirming unit CNF.

Next, function of each block will be described. In the touch sensor base application block TSBA, signals are exchanged between the base application BA and the touch sensor driver upper-layer application interface API to decide whether or not to activate the touch sensor module TSM. The base application BA is a base application for the sub-display unit display application API which is an application for the sub-display unit, the lock security application AP2 which is an application for locking the cellular phone terminal 100 for protecting security of FeliCa, and other applications AP3. The base application BA requests the touch sensor driver upper-layer application interface API to activate the touch sensor module TSM when there is a request for activation of the touch sensor from above each application. In the cellular phone terminal 100 according to this embodiment, the sub-display unit refers to the sub-display unit ELD formed on the central region of the sensor element groups arranged annularly.

When receiving a request for activation of the touch sensor module TSM, the touch sensor driver upper-layer application interface API confirms whether the touch sensor module TSM can be activated to a block (not shown) that manages activation of applications in the base application BA. In other words, the touch sensor driver upper-layer application interface API checks whether the sub-display unit ELD is lightened to indicate that an application is being selected, or whether there is a flag indicating activation of an application for which the touch sensor module TSM is previously disabled, such as FM radio and other applications in the cellular phone terminal 100. As the result, when it is determined that the touch sensor module TSM can be activated, the touch sensor driver upper-layer application interface API requests activation of the touch sensor module TSM to the touch sensor driver TSD. In other words, the power supply PS actually starts to provide power to the touch sensor module TSM through the power supply controller PSCON.

When there is a request for activation of the touch sensor module TSM, the touch sensor driver TSD requests the serial interface unit SI in the device layer DL to open a port to the touch sensor driver TSD in the serial interface unit SI.

And then, under the control of the touch sensor driver TSD, signals containing information of sensing results by the touch sensor module TSM (hereinafter, it is referred to as contact signal) are outputted to the serial interface unit SI with a period 20 ms according to an internal clock of the touch sensor module TSM.

The contact signal is outputted as a signal having 8 bits corresponding to 8 sensor elements L1~L4 and R1~R4 described above, respectively. Specifically, when each sensor element detects a contact, a "flag:1" for indicating a contact detection is set to a bit corresponding to a sensor element which detects the contact, and the contact signal is formed by a series of these bits. In other words, the contact signal contains information indicating which sensor elements are contacted or not contacted.

The serial interrupt monitoring unit SIMON in the interrupt handler IH extracts to the contact signal outputted to the serial interface unit SI. In here, the confirming unit CNF confirms True/False of the extracted contact signal according to a predetermined condition in the serial interface unit SI, and inserts only data of TRUE signal into a queue QUE (classification of True/False of a signal will be described later). And, the serial interrupt monitoring unit SIMON monitors other interruptions of the serial interface unit SI during activation of the touch sensor module TSM such as occurrence of pressing a tact switch described later in the touch sensor module TSM when the touch sensor module TSM is being activated.

In addition, the monitoring unit SIMON inserts a signal indicating "press" before the contact signal in the queue QUE (queuing), when a detected contact is the first contact. And then, the monitoring unit SIMON updates the contact signal with a period of 45 ms according to a clock of an OS timer CLK in the operation system, and inserts a signal indicating "release" into the queue QUE when no contact is detected in a predetermined period. In this way, it is possible to monitor movement of contact detection in sensor elements from the start of contact to the release. The "first contact" means a condition when there is no data in the queue QUE, or a phenomenon that a signal having a "flag:1" is occurred when the nearest input data indicates "release". By these processes, the touch sensor driver TSD can recognize detection states of sensor elements in a period from the "press" to the "release".

Simultaneously, the monitor unit SIMON generates a signal indicating "release" falsely and inserts it into the queue QUE when the contact signal outputted from the touch sensor module TSM satisfies a condition for being FALSE. In here, a condition for being False is satisfied when "contacts are detected by two sensor elements which are not continuous", "an interruption is occurred during activation of the touch sensor module TSM (for example, when a lighting/lighting-out status of the sub-display unit ELD is changed due to a notice of receiving a mail or the like)", "when a key is pressed during activation of the touch sensor module TSM" or the like.

When adjacent two sensor elements, which are for example, sensor elements R2 and R3 detect contacts, the monitoring unit SIMON inserts a contact signal in which flags are set to bits corresponding to devices which detect the contacts into the queue QUE, similarly to the case that one device detects a contact.

The touch sensor driver TSD reads out the contact signal from the queue QUE with a period of 45 ms, and determines a device that detects the contact. The touch sensor driver TSD determines "a contact start device", "moving direction of the contact (turning right/left)", and "moving distance from the press to the release" based on changes of contacts determined by the contact signal read out from the queue QUE successively, and a positional relation between devices that detect contacts. The touch sensor driver TSD writes determination results to the result notifying unit NTF and notifies the base application BA to update data with the result.

In this embodiment, the cellular phone terminal 100 has a "detection mode in semicircle" and a "detection mode in circle" as determination modes of a moving direction and a moving distance of contacts by the contact signal. The "detection mode in semicircle" and the "detection mode in circle" are selectively applied according to an application executed, and will be described below in detail.

As described above, when update of the result is notified to the base application BA by the touch sensor driver TSD, the base application BA confirms the result notifying unit NTF and notifies content of the information notified to the result notifying unit NTF to an application (sub-display unit display application AP1 for displaying a menu screen on the sub-display unit, the lock security application AP2 for lock control, or the like) which is a higher application and needs a contact operation result of the touch sensor module TSM.

Figure 5:
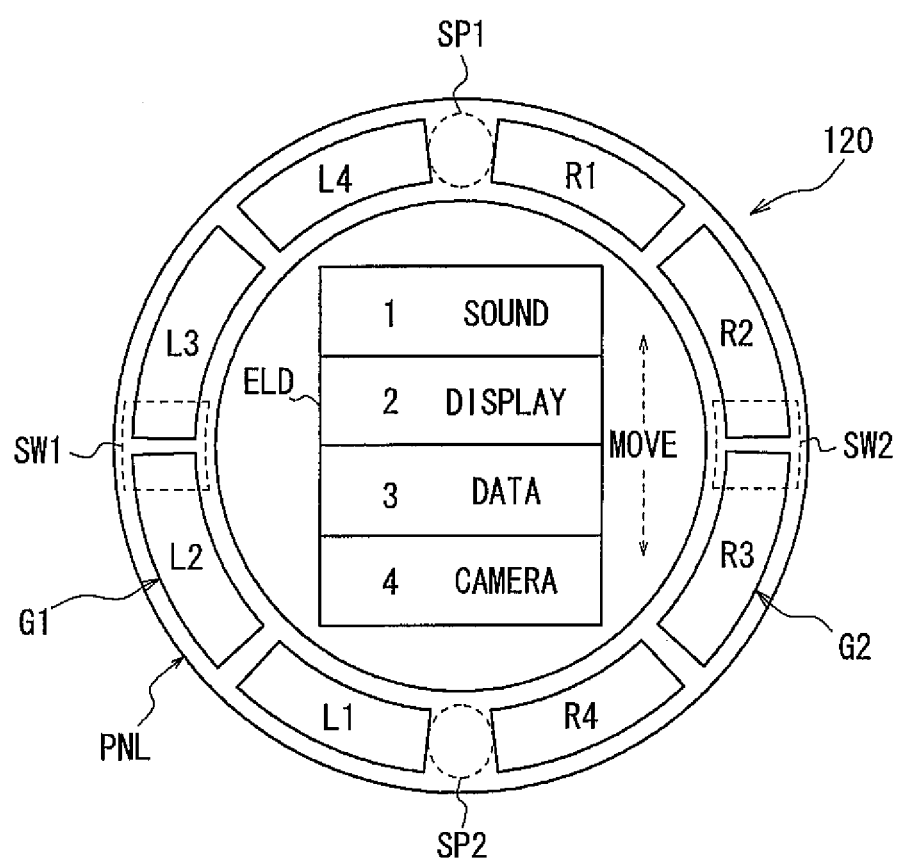
FIG. 5 is a plane view illustrating arrangement of elements of the cellular phone terminal according to the present invention.

FIG. 5 is a plane view illustrating arrangement of elements of the sensor unit 120 and the sub-display unit ELD. For convenience sake, only some elements are shown and explained. As shown, the annular panel PNL is provided around the sub-display unit ELD formed by an organic-EL device. The panel PNL is preferably thin enough not to affect sensitivity of sensor elements arranged under itself. Eight capacitance-type sensor elements L1~L4 and R1~R4 for detecting contact/approach of a finger are arranged annularly under the panel PNL. Four sensor elements L1~L4 on the left side compose the first sensor element group G1, and four sensor elements R1~R4 on the right side compose the second sensor element group G2. Between adjacent sensor elements in each sensor element group, a clearance is formed so that a sensor element does not interfere in a contact detection function of an adjacent sensor element. When using sensor elements that do not interfere, these clearances are not needed.

A separating portion SP1, which is a larger clearance than the clearance between adjacent sensor elements in the same sensor element group (for example, a length of two or more times), is formed between the sensor element L4 placed on one to end of the first sensor element group G1 and the sensor element R1 placed on one end of the second sensor element group G2. Similarly to the separating portion SP1, a separating portion SP2 is formed between the sensor element L1 placed on the other end of the first sensor element group G1 and the sensor element R4 placed on the other end of the second sensor element group G2. By these separating portions SP1, SP2, it is possible to prevent a finger from interfering in another one, when the first sensor element group G1 and the second sensor element group G2 operate individually.

Sensor elements of the first sensor element group G1 are arranged in a circular arc shape, and the central portion of the tact switch SW1 is arranged under the center of the arc, in other words, the middle of sensor elements L2 and L3. Similarly, the central portion of the tact switch SW2 is arranged under the center of a circular arc formed by sensor elements of the second sensor element group G2, in other words, the middle of sensor elements R2 and R3 (see FIG. 6).

Arranging the tact switch around the center of the arrangement direction of the sensor element group, which is a place not associated with direction, allows a user to easily recognize that this switch is for operation having no relation directly to an instruction operation for movement having direction by a finger of the user on the sensor element. In other words, if the tact switch is not arranged on the center of the arrangement direction of the sensor element group but arranged on an end portion (for example, L1 or L4), since this switch associates direction to the end portion, a user may misunderstand the switch as a "switch" to be pressed long to continue a moving operation by the sensor element or the like. On the contrary, like this embodiment, when the tact switch is arranged on the center of the arrangement direction of the sensor element group, it is possible to prevent a user from having such a misunderstanding, and to provide more comfortable user interface. Moreover, since the tact switch is arranged under the sensor element and not exposed to the surface of the apparatus, it is possible to reduce the number of operation units exposed to the appearance of the apparatus, and therefore, to make a smart impression that seems not to require complicated operations. When the switch is formed in another location except for the lower part of the panel PNL, it is necessary to form a through hole on the housing of the apparatus, which may lead to reduction of strength of the housing according to a location on which the trough hole is formed. In this embodiment, the tact switch is arranged under the panel PNL and sensor elements, so that it is not necessary to form a new through hole and it is possible to prevent strength of the housing from being reduced.

For example, while the sub-display unit display application AP1 for displaying a menu screen on the sub-display unit ELD is executed, if a user, for example, slides a finger upward over sensor elements L1, L2, L3, L4 successively in an arc shape, an item displayed as a selection target legion (emphasized with reversed display, another color, or the like) among selection candidate items (in this case, camera, data, display, sound) displayed on the display unit ELD is changed to a upper item successively, or selection candidate items are scrolled upward. When a desired selection candidate item is displayed as the selectable region, the user can select it by pushing the tact switch SW1 through the panel PNL and sensor elements L2, L3, or can change a screen display to another one by pushing the tact switch SW2. In other words, the panel PNL has also a function as a pusher to the tact switches SW1, SW2 by being provided on the housing of the apparatus so as to have flexibility enough to push tact switches SW1, SW2, or to be able to tilt slightly.

FIG. 6 is a perspective view of the sensor unit 120 shown in FIGS. 2 and 5. As shown, the panel PNL and the sub-display unit ELD are disposed on the first layer that forms an outer face of the housing of the apparatus. Sensor elements L1~L4 and R1~R4 are arranged on the second layer under the panel PNL of the first layer. Tact switches SW1, SW2 are respectively arranged on the third layers under the region between sensor elements L2, L3 of the second layer and under the region between sensor elements R2, R3.

Figure 7:
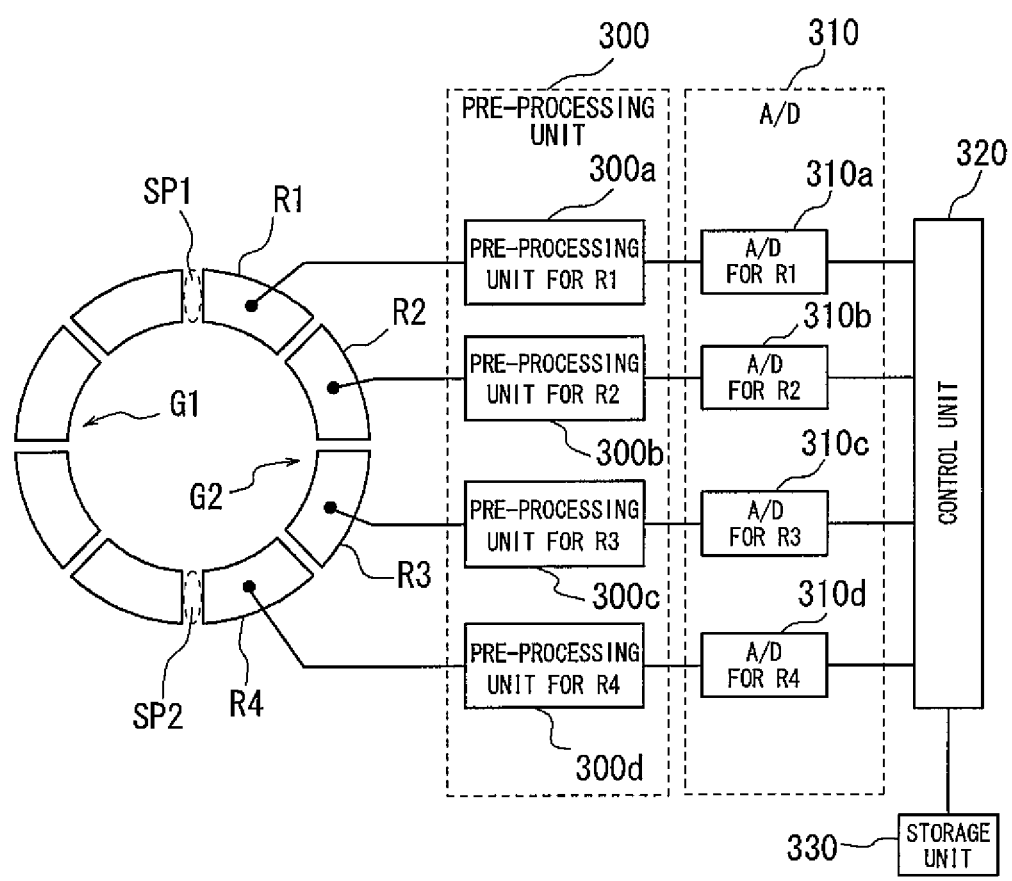
FIG. 7 is a block diagram illustrating a process of contact detection data from each sensor element of the cellular phone terminal according to the present invention.

FIG. 7 is a block diagram illustrating a process of contact detection data from each sensor element. For sake of convenience, while the process of data from sensor elements R1~R4 is only shown, it is similarly applied to sensor elements L1~L4. High frequency signals are applied to sensor elements R1~R4, respectively. A pre-processing unit 300 (a pre-processing unit for R1 300a, a pre-processing unit for R2 300b, a pre-processing unit for R3 300c and a pre-processing unit for R4 300d) calibrates each sensor element R1~R4 by considering variation on a stray capacitance, sets the high frequency condition at this time as a reference, and detects variation of the high frequency condition based on changes of capacitance due to contacts of a finger or the like. Detection signals by the pre-processing unit 300 are sent to an A/D converter 310 (an A/D converter for R1 310a, an A/D converter for R2 310b, an A/D converter for R3 310c and an A/D converter for R4 310d), and converted to digital signals indicating contact detection. The digital signals are sent to a control unit 320. The control unit 320 acquires 8-bit contact signal by adding them to signals from sensor elements L1~L4, converts the 8-bit contact signal, for example, into hexadecimal, and stores it in a storage unit 330. And then, the control unit 320 outputs this signal to the serial interface unit, the interrupt handler. The signal is converted to a signal readable by the touch sensor driver in the interrupt handler, and then inserted into the queue. Moreover, the control unit 320 detects a direction when two or more adjacent sensor elements detect contacts based on information stored in the storage unit 330.

Next, the "detection mode in semicircle" and the "detection mode in circle" by the cellular phone terminal 100 of this embodiment will be described.

First, the "detection mode in semicircle" will be described. The "detection mode in semicircle" is for detecting a moving direction and a moving distance of a contact operation in the sensor unit 120 in order to select an item displayed on the sub-display unit ELD, for example, while the music player application, sub-display unit display application AP1 or the like described above is executed.

FIGS. 8 and 9 show one example of the "detection mode in semicircle", and illustrate responses of the sub-display unit when a user traces on sensor elements. In FIGS. 8 and 9, (a)s are schematic diagrams illustrating only, for ease of explanation, the sub-display unit mounted on the cellular phone terminal and sensor elements arranged side by side around the sub-display unit; (b)s show temporal transitions of only sensor elements which detect contacts; and (c)s show changes of position of the operation target region on the sub-display unit ELD according to sensor elements which detect contacts, In FIGS. 8(a) and 9(a), the same reference numerals with those of FIG. 2(b) are used for sensor elements, sensor element groups and separating portions. In display on the sub-display unit ELD of (c)s, T1 indicates a title of an item list that the sub-display unit displays, and LS1~LS4 indicate selection candidate items (for example, scrollable several lines). On the sub-display unit of (c)s, an operable item is displayed with an emphasized display such as a cursor disposed on the item or a reversed display of the item so as to be discriminated as a current operation target region. In figures, an item indicated as the operation target region is emphasized by being hatched. For convenience of explanation, "moving target" is explained with only operation target region, but when moving (scrolling) an item itself, the sub-display unit operates with a similar method.

When a user traces sensor elements continually with a contact means, for example a finger or the like, from top to bottom as indicated by an arrow AR1 in FIG. 8(a), the control unit 320 detects a temporal transition of contacts as shown in FIG. 8(b). In this case, sensor elements R1, R2, R3, R4 detect contacts in order. Since the continuous contacts from R1 to R4 are detected by two or more adjacent sensor elements, the control unit 320 detects a direction, and the operation target region moves on the list displayed on the sub-display unit ELD according to the number of transition to adjacent sensor elements and the direction. In this case, as shown in FIG. 8(c), the operation target region moves downward by 3 items from the item LS1 of the initial position to the item LS4. The operation target region is shown by being hatched: one hatched with narrow pitches is the initial position; and the other hatched with wide pitches is the position after movement. In this way, according to this embodiment, since "the operation target region moves downward" on the sub-display unit similarly to the "instruction operation by a finger moving downward" of a user, the user feels like moving the operation target region freely with his finger. In other words, it is possible to achieve an operation feeling as intended by a user.

Similarly, when sensor elements are glided in a direction indicated by an arrow AR2 in FIG. 8(a), sensor elements L4, L3, L2, L1 among sensor elements detect contacts in order as shown in FIG. 8(b). In this case, since detected contacts transit three adjacent sensor elements from top to bottom like the arrow AR1, the operation target region moves downward by three items from the item LS1 to the item LS4 as shown in FIG. 8(c).

When sensor elements are traced form bottom to top (counterclockwise) as indicated by an arrow AR1 in FIG. 9(a), sensor elements R4, R3, R2, R1 among sensor elements detect contacts in order as shown in FIG. 9(b). In this case, since detected contacts transit three adjacent sensor elements from bottom to top, the operation target region moves upward by three items from the item LS4 to the item LS1 as shown in FIG. 9(c).

Similarly, when sensor elements are traced from bottom to top (clockwise) as indicated by an arrow AR2 in FIG. 9(a), sensor elements L1, L2, L3, L4 detect contacts in order as shown in FIG. 9(b). In this case, since detected contacts transit three adjacent sensor elements from bottom to top like the arrow AR1, the operation target region moves upward by three items from the item LS4 to the item LS1 as shown in FIG. 9(c).

Below, it will be described about a response of the sub-display unit in case sensor elements continuously detect contact crossing over the separating portion SP1 or SP2 of a sensor element group with a response in case sensor elements detect contacts not crossing over the separating portion, when a user traces on sensor elements with a finger or the like.

FIGS. 10~13 show cases that a user contacts adjacent two sensor elements continuously. FIG. 10 shows a response of the sub-display unit when a user traces on a plurality of sensor elements with a finger or the like. In FIG. 10(a), when a user traces on two sensor elements continuously from bottom to top as indicated by an arrow AR, the control unit 320 detects a temporal transition of contacts as shown in FIG. 10(b). Which means, in other words, that a finger or the like contacts sensor elements L3, L4 in order. In this case, since the continuous contacts from the sensor element L3 to the sensor element L4 does not cross over the separating portion SP1 and are detected by two or more adjacent sensor elements, the control unit 320 detects a direction, and the operation target region moves on an item list displayed on the sub-display unit ELD according to the number of transitions to adjacent sensor elements and the direction. In this case, when the initial position of the operation target region is LS2, the operation target region moves upward by one item to LS1 as shown in FIG. 10(c).

FIG. 11 shows a response of the sub-display unit when a user contacts the first sensor element group G1 and the second sensor element group G2 continuously by crossing over the separating portion SP1. In FIG. 11(a), when a user traces on two sensor elements continuously from left to right as indicated by an arrow AR with a finger or the like, the control unit 320 detects a temporal transition of contacts as shown in FIG. 11(b). In this case, sensor elements L4, R1 detect contacts in order. In the cellular phone terminal (electronic apparatus) according to this embodiment, when sensor elements detect contacts crossing over the separating portion, a movement of the contacts is valid in case that contacts before and after crossing over the separating portion are detected by two or more sensor elements in each sensor element group G1 or G2. When a contact before and after crossing over the separating portion is detected by only one sensor in the sensor element groups G1 and G2 before and after crossing over the separating portion, the movement for one sensor crossing over the separating portion is regarded as invalid. Accordingly, in this case, since one sensor element L4 in the first sensor element group detects a contact, and then the number of detections of the contact crossing over the separating portion SP1 by adjacent sensor elements in the second group is only one by the sensor element R1, the movement from the first contact L4 detected by the first sensor element group G1 to the second contact R1 detected by the second sensor element group G2 is regarded as invalid. Therefore, the operation target region on the sub-display unit ELD does not move as shown in FIG. 11(c).

FIG. 12 shows a response of the sub-display unit when a user traces on sensor elements. In FIG. 12(a), when a user traces on sensor elements continuously from bottom to top as indicated by an arrow AR with a finger or the like, the control unit 320 detects a temporal transition of contacts as shown in FIG. 12(b). In this case, sensor elements R2, R1 detect contacts in order. Similarly to the case of FIG. 8, since a movement of user's finger or the like on sensor elements does not cross over the separating portion SP, the movement of contact detections is valid. Accordingly, when the initial position of the operation target region is LS2, the operation target region moves upward by one item to the LS1 as shown in FIG. 12(c).

FIG. 13 shows a response of the sub-display unit when a user contacts sensor elements of the first sensor element group G1 and the second sensor element group G2 continuously by crossing over the separating portion SP1 similarly to FIG. 11. In FIG. 13(a), when a user traces on sensor elements continuously from right to left as indicated by an arrow AR with a finger or the like, the control unit 320 detects a temporal transition of contacts as shown in FIG. 13(b). In this case, sensor elements R1, L4 detect contacts in order. By a similar way to FIG. 11, since the first contact before crossing over the separating portion SP1 is detected by one sensor element R1 in the second sensor element group G2, and the second contact after crossing over the separating portion SP1 is detected by one sensor element L4 in the first sensor element group G1, a movement from R1 to L4 is regarded as invalid. Therefore, the operation target region on the sub-display unit ELD does not move as shown in FIG. 13(c).

FIGS. 14~19 show cases that when a user contacts adjacent three sensor elements continuously, the contact is crossing or not crossing over the separating portion SP1. FIG. 14 shows a response of the sub-display unit when a user traces on sensor elements with a finger or the like. In FIG. 14(a), when a user traces on sensor elements continuously from bottom to top as indicated by an arrow AR, the control unit 320 detects a temporal transition of contacts as shown in FIG. 14(b). In this case, to sensor elements L2, L3, L4 detect contacts in order. Similarly to the case of FIG. 9, since a movement does not cross over the separating portion SP1, contact detections by L2~L4 is valid. Accordingly, when the initial position of the operation target region is LS3, the operation target region moves upward by two items to the LS1 as shown in FIG. 14(c).

FIG. 15 shows a response of the sub-display unit when a user contacts the first sensor element group G1 and the second sensor element group G2 continuously by crossing over the separating portion SP1. In FIG. 15(a), when a user traces on sensor elements continuously from left to right as indicated by an arrow AR with a finger or the like, the control unit 320 detects a temporal transition of contacts as shown in FIG. 15(b). In this case, sensor elements L3, L4, R1 detect contacts in order. As shown, after two contacts are detected in the first sensor element group, the number of sensor elements that detect contacts crossing over the separating portion SP1 in the second sensor element group is one. Accordingly, the first contact (from L3 to L4) detected by the first sensor element group G1 is valid, while the movement to the second contact (from L4 to R1) detected by the second sensor element group G2 is invalid. Therefore, similarly to the case of FIG. 11, a selection item moves on the list displayed on the sub-display unit ELD according to the number of transition to adjacent sensor elements and the direction. For example, when the initial position of the operation target region is LS2, the operation target region moves upward by one item to the LS1 as shown in FIG. 15(c).

FIG. 16 shows a response of the sub-display unit when a user traces on sensor elements with a finger or the like. In FIG. 16(a), when a user traces on sensor elements continuously from left to right as indicated by an arrow AR, the control unit 320 detects a temporal transition of contacts as shown in FIG. 16(b). In this case, sensor elements L4, R1, R2 detect contacts in order. In this case, the first contact before crossing over the separating portion SP1 is detected by only one sensor element L4, the movement of contact detections from L4 to R1 crossing over the separating portion SP1 is invalid. However, the movement from R1 to R2 is valid because two contacts are detected after crossing over the separating portion SP1. Therefore, similarly to the case of FIG. 15, when the initial position of the operation target region is LS2, the operation target region moves downward by one item to the LS3 as shown in FIG. 16(c).

FIG. 17 shows a response of the sub-display unit when a user traces on sensor elements with a finger or the like. In FIG. 17(a), when a user traces on sensor elements continuously from bottom to top as indicated by an arrow AR, the control unit 320 detects a temporal transition of contacts as shown in FIG. 17(b). In this case, sensor elements R3, R2, R1 detect contacts in order. Similarly to the case FIG. 14, since a movement does not cross over the separating portion SP1, when the initial position of the operation target region is LS3, the operation target region moves upward by two items to LS1 as shown in FIG. 17(c).

FIG. 18 shows a response of the sub-display unit when a user traces on sensor elements with a finger or the like. In FIG. 18(a), when a user traces on sensor elements continuously from right to left as indicated by an arrow AR, the control unit 320 detects a temporal transition of contacts as shown in FIG. 18(b). In this case, sensor elements R2, R1, L4 detect contacts in order. Since two contacts are detected before crossing over the separating portion SP1, a movement from R2 to R1 is valid. However, a movement from R1 to L4 is invalid since only one contact is detected after crossing over the separating portion SP1. Therefore, similarly to the case FIG. 11, when the initial position of the operation target region is LS2, the operation target region moves upward by one item to LS1 as shown in FIG. 18(c).

FIG. 19 shows a response of the sub-display unit when a user traces on sensor elements with a finger or the like. In FIG. 19(a), when a user traces on sensor elements continuously from right to left as indicated by an arrow AR, the control unit 320 detects a temporal transition of contacts as shown in FIG. 19(b). In this case, sensor elements R1, L4, L3 detect contacts in order. Since the first contact before crossing over the separating portion SP1 is detected by only one R1, a movement from R1 to L4 is invalid. On the other hand, a movement from L4 to L3 is valid because two contacts are detected after crossing over the separating portion SP1. Accordingly, similarly to the case FIG. 11, when the initial position of the operation target region is LS2, the operation target region moves downward by one item to LS3 as shown in FIG. 19(c).

While processes when contacts cross over the separating portion SP1 are described with cases of not crossing over a separating portion, the above description is applied to processes when contacts cross over the separating portion SP2 similarly.

As described above, in the "detection mode in semicircle", movements of contact detections by each sensor element group are detected individually, so that it is possible to be employed to the first control, for example, which moves the selection item displayed on the sub-display unit ELD according to each movement.

Next, the "detection mode in circle" will be described. The "detection mode in circle" can be employed to the second control, for example, which detects a circulation number and a circulation direction of contact operations in the sensor unit 120 in case of removing a security lock while the lock security application AP2 is executed.

Figure 20:
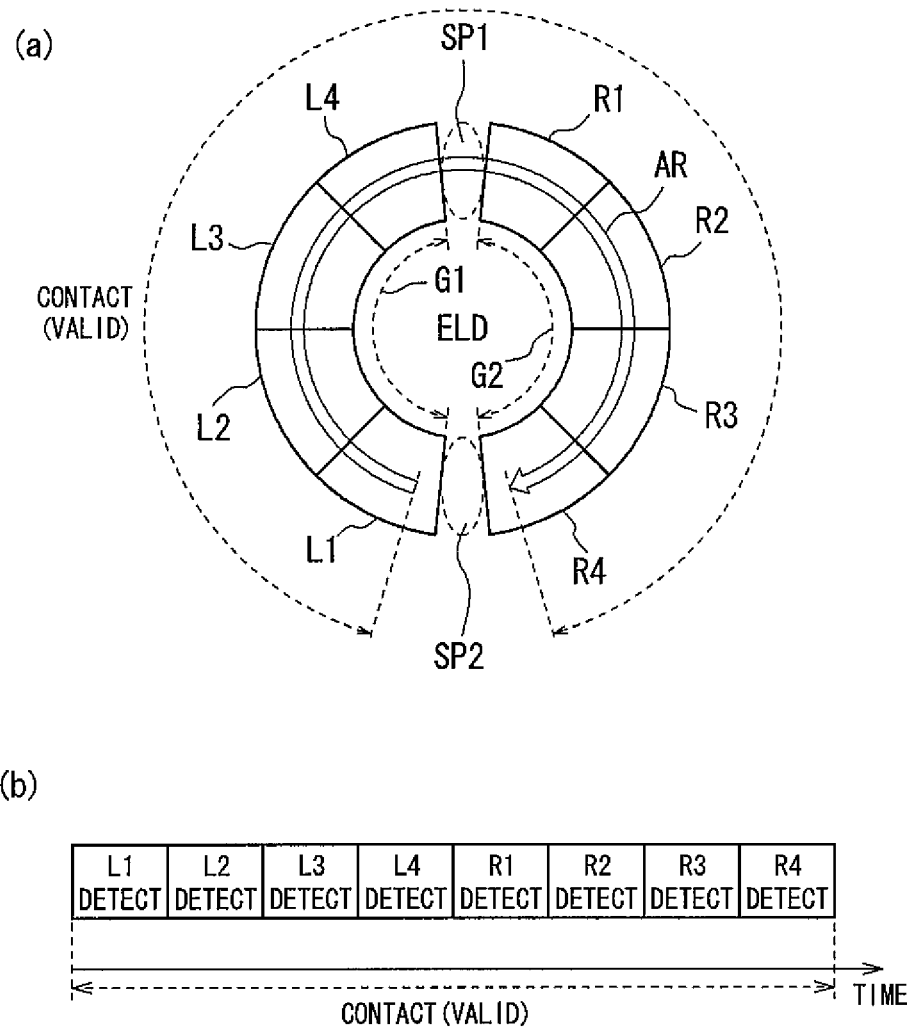
FIG. 20 shows a response of the sub-display unit when a user traces on sensor elements.

FIG. 20 shows an example of the "detection mode in circle". The design and arrangement of sensor element groups G1, G2 having a plurality of sensor elements are the same with those of the "detection mode in semicircle". The "detection mode in circle" detects inputs with another control system, for example, by changing an application with using a cellular phone of the same design with the "detection mode in semicircle".

FIG. 20(a) shows the first sensor element group G1 and the second sensor element group G2 having a plurality of sensor elements. Both ends of the first sensor element group G1 are arranged respectively adjacent to both ends of the second sensor element group G2 with interposing separating portions SP1, SP2 between them. Since the panel PNL is mounted on these sensor element groups, a user can trace smoothly with a finger from an end portion of the sensor element group G1 to a start portion of the sensor element group G2 by crossing over the separating portion SP1, or from an end portion of the sensor element group G2 to the start portion of the sensor element group G1 by crossing over the separating portion SP2 without having a sense of incongruity. In other words, a user can do circular movement with his finger smoothly on sensor element groups G1, G2 formed in a circular shape by interposing separating portions SP1, SP2.

In the "detection mode in circle", as indicated by an arrow AR of FIG. 20(a), a user can trace on sensor elements L1~L4 of the sensor element group G1 in order with a finger or the like, and continuously trace sensor elements R1~R4 of the sensor element group G2 in order by crossing over the separating portion SP1, in other words, the user can do a tracing operation to draw a circle clockwise along sensor element groups located around the sub-display unit ELD. By this operation, as shown in FIG. 20(b), contacts are detected by sensor elements in order as a series of continuous movements.

Since such a circular movement can be circulated, the user can do circular movements repeatedly. And the control unit 320 can detect a plurality of clockwise circulations by detecting the contacts with sensor elements.

FIG. 21 shows a "detection mode in circle" contrary to the FIG. 20. The design of a plurality of sensor elements L1~L4 and R1~R4 composing sensor element groups G1, G2 is the same with those FIG. 20. When a user circulates a finger counterclockwise contrary to the case of FIG. 20, each sensor element detects a corresponding contact according to the movement. Similarly to above case, when a user does circular movements repeatedly, the control unit 320 can detect a plurality of counterclockwise circulations by detecting the contacts with sensor elements.

As described above, in the "detection mode in circle", it is possible to detect contacts of a plurality of clockwise or counterclockwise circulations as well as contacts of one clockwise or counterclockwise circulation, by detecting contacts of clockwise or counterclockwise circulation movement(s). For example, by setting one clockwise or counterclockwise circulation as a unit and by combing these circulation movements, detection of one circulation may be used, for example, as a key when a user removes a security lock by a lock security application of non-contact communication such as charging service employing an RFID or the like. In other words, in state that such a lock (use restriction) is used, if an operation is detected by a touch sensor, the detection is noticed to the lock security application or the like, and when a lock removing condition such as circulations of a predetermined number in a predetermined circulation direction is met, the lock security application removes the lock. Moreover, a detection of a plurality of circulations is used for operations required to control continuous values minutely like the volume control when music is displayed, for example, volume up control according to a clockwise rotation and volume down control according to a counterclockwise rotation.

Especially, when detecting an operation tracing on sensor element groups by one circulation, it may be considered that a user does an operation with feelings of his hands without seeing sensor elements arranged on the housing of the cellular phone terminal carefully, or without seeing sensor elements at all. In this case, if an operation region for operating sensor elements for detecting contacts is not secured, a user may frequently make mistakes, and sensor elements may not determine inputs as user's intention.

As described above, the portable electronic apparatus 100 can switches the "detection mode in circle" and "detection mode in semicircle" with applications provided in the portable electronic apparatus 100 by employing an input devices that can be regarded as one as a whole. Accordingly, when using sensor element groups according to the present invention, it is not necessary to provide an input device for each mode individually, and since an input device in which an operation region is secured, and which can be regarded as one as a whole is used, a user can input as his intention, and it is possible to reduce input mistakes of a user and wrong determinations of a device.

While the invention has been described with reference to exemplary embodiments and drawings, it will be understood by those skilled in the art that many various modifications and extensions of the above-described technology may be implemented using the teaching of this invention. All such modifications and extensions are intended to be included within the true spirit and scope of the present invention. For example, each member, each means, each step and the like can be rearranged not to be contradictory logically. And, a plurality of unit, steps and the like can be combined or divided.

For example, in embodiments described above, a layout of sensor elements provided annularly is described, but sensor elements can be arranged to interpose a display unit with a U-shape. In addition, in above embodiments, sensor element groups are arranged on left and right sides of the display unit, but they may be arranged on top and bottom of the display unit.

Moreover, in this embodiment, an example for starting the second control such as removing a security lock by an occurrence of one circulation detection is described with two patterns. In other words, one pattern is that a sensor element which detects a contact is varied clockwise from the sensor element L1 of the start portion of the first sensor element group G1, and that contact detections occur continuously to the sensor element R4 of the end portion of the second sensor element group G2; and the other pattern is that a sensor element which detects a contact is varied counterclockwise from the sensor element R4 of the end portion of the second sensor element group G2, and that contact detections occur continuously to the sensor element L1 of the start portion of the first sensor element group G1. However, the present invention is not limited to these two patterns, but may be designed to execute the second control by contacts of a different pattern as an occurrence of the one circulation detection. For example, the one circulation detection may be complete when a sensor element which detects a contact varies clockwise from a sensor element (for example L3) located on a portion which is not the start portion nor the end portion of the first sensor element group G1, contact detections transit continuously toward the start portion R1 of the second sensor element group G2, after contact detections reach to the end portion R4 of the second sensor element group G2, contact detections continuously occur at the start portion (L1) of the first sensor element group G1, and then the contact detection transits to L2 before the start point (L3).

Moreover, in embodiments described above, an example in which contact detections occur continuously from the start point to a portion before the start point by one in a circulation direction is described for contact detections by a circulation operation as one circulation detection, but it may be designed to decide an occurrence of the circulation operation when contact detections continuously occur from a start point to the start point.

Moreover, in the embodiment described above, two sensor element groups, the sensor element group G1 and the sensor element group G2 are used, but the number of sensor element groups may be set to three or more. For example, as shown in FIGS. 22~24, a sensor element group G1 having sensor elements L1~L3, a sensor element group G2 having sensor elements R1~R3, and a sensor element group G3 having sensor elements M1~M3 may be arranged annularly for a start portion and an end portion of each sensor elements to be adjacent. In this design, for example, in the "detection mode in semicircle", when contacts are detected in one sensor element group as indicated by an arrow AR of FIG. 22(a), detections are successively performed as shown in FIG. 22(b), and the operation target region moves upward by two items as shown in FIG. 22(c). Moreover, in the "detection mode in semicircle", when contacts are detected in two sensor element groups G1 and G2 by crossing over the separating portion SP1 as indicated by an arrow AR of FIG. 23(a), and when only one sensor element R1 detects a contact crossing over the separating portion SP1, the contact detection by one sensor element after crossing the separating portion SP1 is invalid, and the operation target region moves upward by one item (FIG. 22(c)). However, when contacts cross over the separating portion SP1 and are detected by two or more sensor elements, detections of the contact crossing over the separating portion SP1 by two or more sensor elements are valid. Moreover, in "detection mode in circle", when a user traces sensor elements of one circulation through all sensor element groups as indicated by an arrow AR of FIG. 24(a) with a finger or the like, contacts are continuously detected by sensor elements according to the order (FIG. 24(b)).

Moreover, above embodiments are described with a cellular phone as an example, but the present invention can be widely applied to portable electronic apparatus such as portable wireless terminal, PDA (personal digital assistant), portable game devices, portable audio player, a portable video player, portable electronic dictionary, portable electronic book viewer or the like. In addition, in embodiments, a capacitance-type contact sensor is used as a sensor element, but a thin-film-resistance-type contact sensor described above, an optical-type sensor that detects a contact by variation in light receiving amount, a SAW-type sensor that detects a contact by decrement of surface acoustic wave, an electromagnetic-induction-type sensor that detects a contact by generation of induced current may be employed. There are some kinds of contact sensors that need to use an indication device such as an exclusive pen or the like except for a finger, and the present invention may be applied to a portable electronic apparatus having such a contact sensor.

INDUSTRIAL APPLICABILITY

According to the present invention, a portable electronic apparatus employing a plurality of sensor elements for detecting contacts and arranged annularly, can switch a control for a plurality of sensor element groups to detect a contact as individual sensor element groups, and a control for a plurality of sensor element groups to detect a circulation contact as one sensor element group as a whole, so that it is possible to perform a control like having a plurality of management system in one user interface as a whole. Thus, it is possible to deal with contact detections of user's finger according to various applications. Therefore, it is possible to reserve an operation area for a user to do input operations without enlarging a mounting area of an interface, and a user can do operations as his intention, so that it is possible to improve operability.

The invention claimed is:

1. Portable electronic apparatus comprising:
a first sensor element group and a second sensor element group each having a plurality of sensor elements for detecting a contact and arranged continuously; and
a control unit capable of performing a first control in which individual controls are performed according to whether a contact is detected by a sensor element of the first sensor element group or the second sensor element group, wherein
the first sensor element group and the second sensor element group are arranged annularly so that their ends are adjacent to each other,
the control unit performs the first control when a continuous contact is detected only within the first sensor element group or only within the second sensor element group, the first control being based on change of position of the contact within the first or the second sensor element group, and
the control unit performs a second control when a continuous contact is detected annularly within the first sensor element group and then the second sensor element group, the second control being different from the first control and the second control removes a security lock.

2. The portable electronic apparatus according to claim 1, wherein the control unit performs the first control according to continuous contact detections by a plurality of sensor elements along an arrangement direction of sensor elements in each group, only within either one group of the first sensor element group and the second sensor element group.

3. The portable electronic apparatus according to claim 1, wherein
the first sensor element group and the second sensor element group are disposed for their sensor elements to be arranged in an annular shape, and
the control unit performs the second control when contacts are continuously detected by sensor elements along the annular shape from the first sensor element group to the second sensor element group.

4. The portable electronic apparatus according to claim 2,
the first sensor element group and the second sensor element group are disposed for their sensor elements to be arranged in an annular shape, and
the control unit performs the second control when contacts are continuously detected by sensor elements along the annular shape from the first sensor element group to the second sensor element group.

5. The portable electronic apparatus according to claim 3, further comprising a display unit for displaying a selection item, wherein
the first control is related to a selection operation for selecting an item in the selection item displayed on the display unit, and
the second control is related to a circulation detection in the first sensor element group and the second sensor element group.

6. The portable electronic apparatus according to claim 4, further comprising a display unit for displaying a selection item, wherein
the first control is related to a selection operation for selecting an item in the selection item displayed on the display unit, and
the second control is related to a circulation detection in the first sensor element group and the second sensor element group.

7. A control method for a portable electronic apparatus having a first sensor element group and a second sensor element group each having a plurality of sensor elements for detecting a contact and arranged continuously, wherein the first sensor element group and the second sensor element group are arranged annularly so that their ends are adjacent to each other, comprising:
performing a contact detection of a sensor element in each sensor element group;
performing a first control in which individual controls are performed according to whether a contact is detected by a sensor element of the first sensor element group or the second sensor element group,
performing the first control when a continuous contact is detected only within the first sensor element group or only within the second sensor element group, the first control being based on change of position of the contact within the first or the second sensor element group, and performing a second control when a continuous contact is detected annularly within the first sensor element group and then the second sensor element group, the second control being different from the first control and the second control disregards the change of position of the contact removes a security lock.

8. The portable electronic apparatus according to claim 1, wherein the control unit performs the second control when a continuous contact is detected annularly within the first sensor element group and then the second sensor element group, the second control being different from the first control and being based on how many circulations are made by the continuous contact and whether the circulation or circulations are clockwise or counterclockwise.

* * * * *